(12) United States Patent
Baker et al.

(10) Patent No.: US 7,095,844 B2
(45) Date of Patent: *Aug. 22, 2006

(54) HIGH DENSITY DSX SYSTEM

(75) Inventors: Scott K. Baker, Richfield, MN (US);
James D. Dewey, Plymouth, MN (US);
Dominic J. Louwagie, Eden Prairie,
MN (US); Harvey J. Chouanard,
Deephaven, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 660 days.

This patent is subject to a terminal disclaimer.

(21) Appl. No.: 10/277,174

(22) Filed: Oct. 18, 2002

(65) Prior Publication Data

US 2004/0076284 A1    Apr. 22, 2004

(51) Int. Cl.
*H04M 3/00*    (2006.01)
*H01R 24/04*    (2006.01)

(52) U.S. Cl. ............... 379/325; 379/326; 379/327; 439/668

(58) Field of Classification Search ............... 361/826, 361/827; 379/325, 326, 327, 328, 329; 439/49, 439/668
See application file for complete search history.

(56) References Cited

U.S. PATENT DOCUMENTS

| | | | |
|---|---|---|---|
| 3,852,703 A | 12/1974 | Carney et al. | |
| 4,548,453 A | 10/1985 | Mummey et al. | |
| 4,603,377 A | 7/1986 | Kobayashi et al. | |
| 4,649,236 A | 3/1987 | De Luca et al. | |
| 4,665,546 A | 5/1987 | Brey et al. | |
| 4,722,702 A | 2/1988 | De Luca et al. | |
| 4,737,985 A | 4/1988 | De Luca et al. | |
| 4,749,968 A | 6/1988 | Burroughs | |
| 4,770,639 A | 9/1988 | Lau | |
| 4,820,200 A | 4/1989 | Lau | |
| 4,840,568 A | 6/1989 | Burroughs et al. | |
| 4,861,281 A | 8/1989 | Warner | |
| 4,911,661 A | 3/1990 | Neuwirth | |
| 4,975,087 A | 12/1990 | Williams et al. | |
| 5,078,624 A * | 1/1992 | Burroughs et al. | ......... 439/668 |
| 5,145,416 A | 9/1992 | Cruise et al. | |
| 5,170,327 A | 12/1992 | Burroughs | |
| 5,199,878 A | 4/1993 | Dewey et al. | |
| 5,220,600 A | 6/1993 | Chouanard et al. | |
| 5,233,501 A | 8/1993 | Allen et al. | |
| 5,393,249 A | 2/1995 | Morgenstern et al. | |
| 5,413,494 A | 5/1995 | Dewey et al. | |
| 5,417,588 A | 5/1995 | Olson et al. | |
| 5,467,062 A | 11/1995 | Burroughs | |
| 5,546,282 A | 8/1996 | Hill et al. | |
| 5,634,822 A | 6/1997 | Gunell | |
| 5,685,741 A | 11/1997 | Dewey et al. | |
| 5,738,546 A | 4/1998 | Burroughs et al. | |
| 5,938,478 A | 8/1999 | Werner | |

(Continued)

FOREIGN PATENT DOCUMENTS

WO    WO 96/38884    12/1996

(Continued)

*Primary Examiner*—Bing Q. Bui
(74) *Attorney, Agent, or Firm*—Merchant & Gould P.C.

(57) ABSTRACT

A DSX system arranged to receive a plurality of high-density chassis is disclosed. The chassis include back planes having rear access IN/OUT fields and rear access cross-connect fields. The rear access fields are electrically connected to termination panels located in respective IN/OUT regions and cross-connect regions. Each of the regions includes cable management channels within which system cables are routed.

27 Claims, 15 Drawing Sheets

U.S. PATENT DOCUMENTS

| | | |
|---|---|---|
| 6,038,766 A | 3/2000 | Werner |
| 6,116,961 A | 9/2000 | Henneberger et al. |
| 6,269,162 B1 | 7/2001 | McMillan |
| 6,467,633 B1 * | 10/2002 | Mendoza ..................... 211/26 |
| 6,743,032 B1 * | 6/2004 | Ogren et al. ................ 439/188 |

FOREIGN PATENT DOCUMENTS

| | | |
|---|---|---|
| WO | WO 99/26427 | 5/1999 |
| WO | WO 00/30219 | 5/2000 |

* cited by examiner

HIGH DENSITY DSX SYSTEM

TECHNICAL FIELD

The present disclosure relates generally to telecommunications equipment. More particularly, the present disclosure relates to a digital cross-connect system.

BACKGROUND

A digital cross-connect system (DSX) provides a location for interconnecting two digital transmission paths. The apparatus for a DSX is located in one or more frames, or bays, usually in a telephone service provider's central office. The DSX apparatus also provides jack access to the transmission paths.

DSX jack inserts are well known and typically include a plurality of bores sized for receiving plugs. A plurality of switches are provided adjacent the bores for contacting the plugs. The jack inserts are electrically connected to digital transmission lines, and are also electrically connected to a plurality of termination members used to cross-connect the jack inserts. By inserting plugs within the bores of the jack inserts, signals transmitted through the jack inserts can be interrupted or monitored.

FIG. 1 schematically illustrates a DSX system that is an example of the type found at a telephone service provider's central office. The DSX system is shown including three DSX jack inserts 10a, 10b and 10c. Each DSX jack insert 10a, 10b and 10c is connected to a specific piece of digital equipment. For example, jack insert 10a is shown connected to digital switch 12, jack insert 10b is shown connected to office repeater 14a, and jack insert 10c is shown connected to office repeater 14b. Each piece of digital equipment has a point at which a digital signal can enter, as well as a point at which the digital signal can exit. The jack inserts 10a, 10b and 10c each include OUT termination pins 16 and IN termination pins 18. The DSX jack inserts 10a, 10b and 10c are connected to their corresponding pieces of digital equipment by connecting the OUT termination pins 16 to the signals exiting the equipment (i.e., going toward the DSX system) and the IN termination pins 18 to the signals entering the equipment (i.e., going away from the DSX system).

Referring still to FIG. 1, jack inserts 10a and 10b are "cross-connected" to one another by semi-permanent connections. A "semi-permanent" connection is a connection that is more permanent than the connections provided by typical patch cords equipped with tip-and-ring plugs. Example semi-permanent connectors include co-axial connectors, wire wrap connectors, RJ-45 type connectors and insulation displacement connectors. The semi-permanent connections extend between cross-connect fields 19 of the jacks inserts 10a and 10b. For example, wires 20 connect OUT cross-connect pins of jack insert 10a to IN cross-connect pins of jack insert 10b. Similarly, wires 21 connect IN cross-connect pins of jack insert 10a to OUT cross-connect pins of jack insert 10b. The jack inserts 10a and 10b are preferably normally closed. Thus, in the absence of a plug inserted within either of the jack inserts 10a and 10b, an interconnection is provided through the jack inserts 10a and 10b and between digital switch 12 and office repeater 14a.

The semi-permanent connection between the digital switch 12 and the office repeater 14a can be interrupted for diagnostic purposes by inserting patch cord plugs within the IN or OUT ports of the jack inserts 10a and 10b. Likewise, patch cords can be used to interrupt the semi-permanent connection between the jack inserts 10a and 10b to provide connections with other pieces of digital equipment. For example, the digital switch 12 can be disconnected from the office repeater 14a and connected to the office repeater 14b through the use of patch cords 23. The patch cords 23 include plugs that are inserted within the IN and OUT ports of the jack 10a and the IN and OUT ports of the jack insert 10c. By inserting the plugs within the IN and OUT ports of the jack insert 10a, the normally closed contacts are opened, thereby breaking the electrical connection with the office repeater 14a and initiating an electrical connection with office repeater 14b.

An important consideration in a digital cross-connect system is circuit density. Another important consideration is cable management. In general, improvement with regards to these and other considerations is desired.

SUMMARY

Various aspects of the present disclosure relate to high density digital cross-connect systems. At least some of the aspects assist in improving circuit densities and/or promoting cable management.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

I. Brief General Overview of the Disclosure

Figure 1:
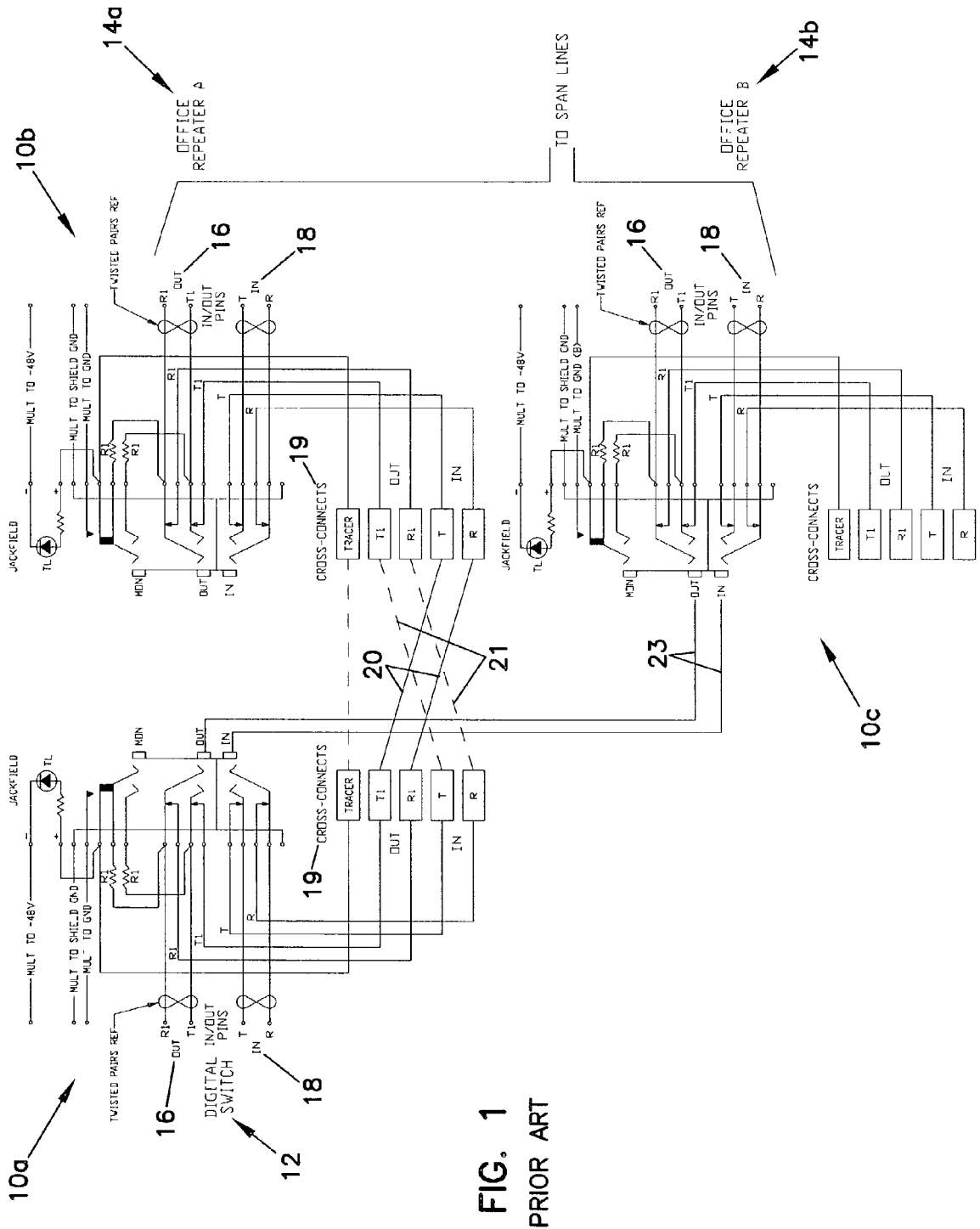
FIG. 1 is a schematic diagram of a prior art DSX system.
Figure 2:
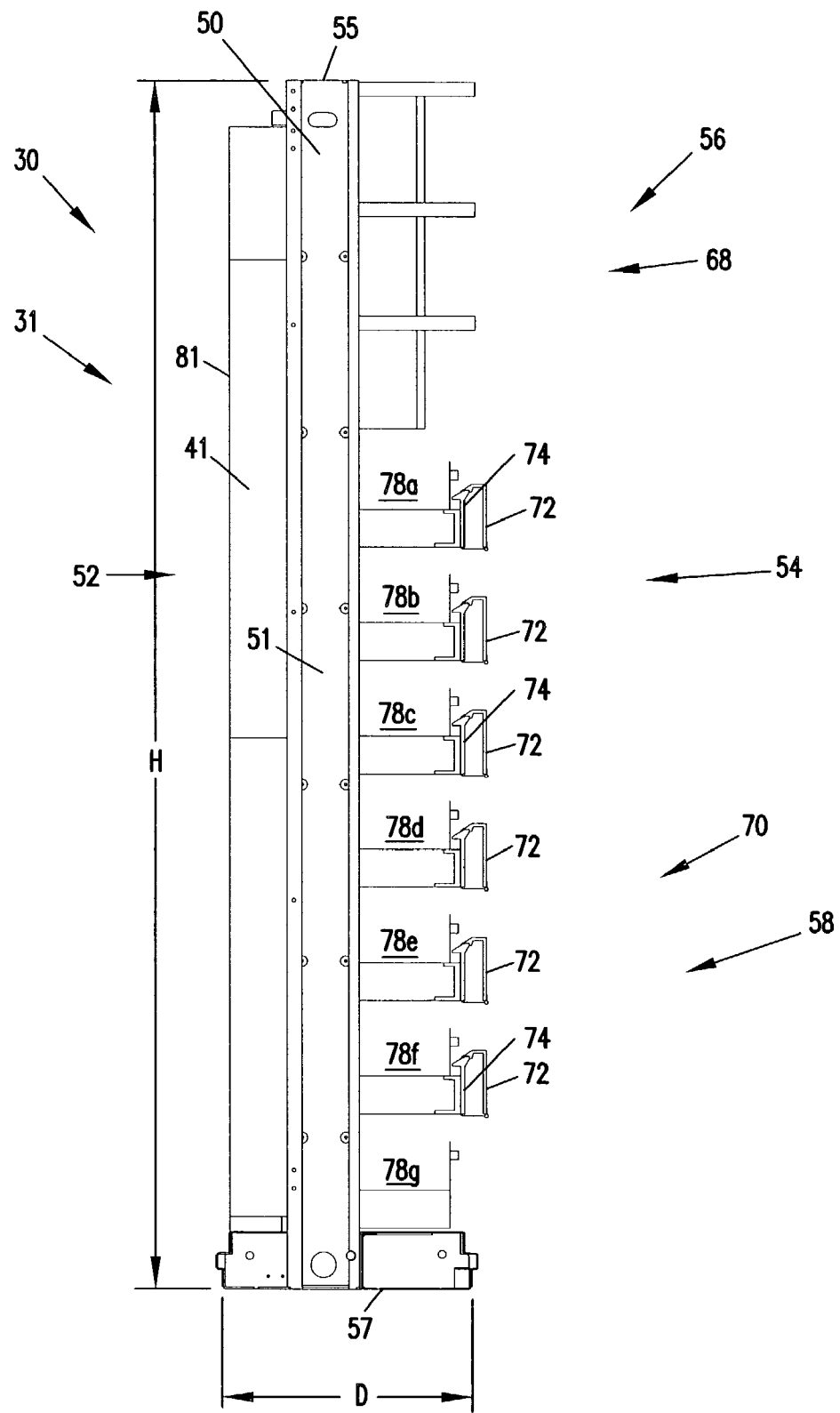
FIG. 2 is a side elevational view of a DSX system that is an embodiment in accord with the present disclosure.
Figure 3:
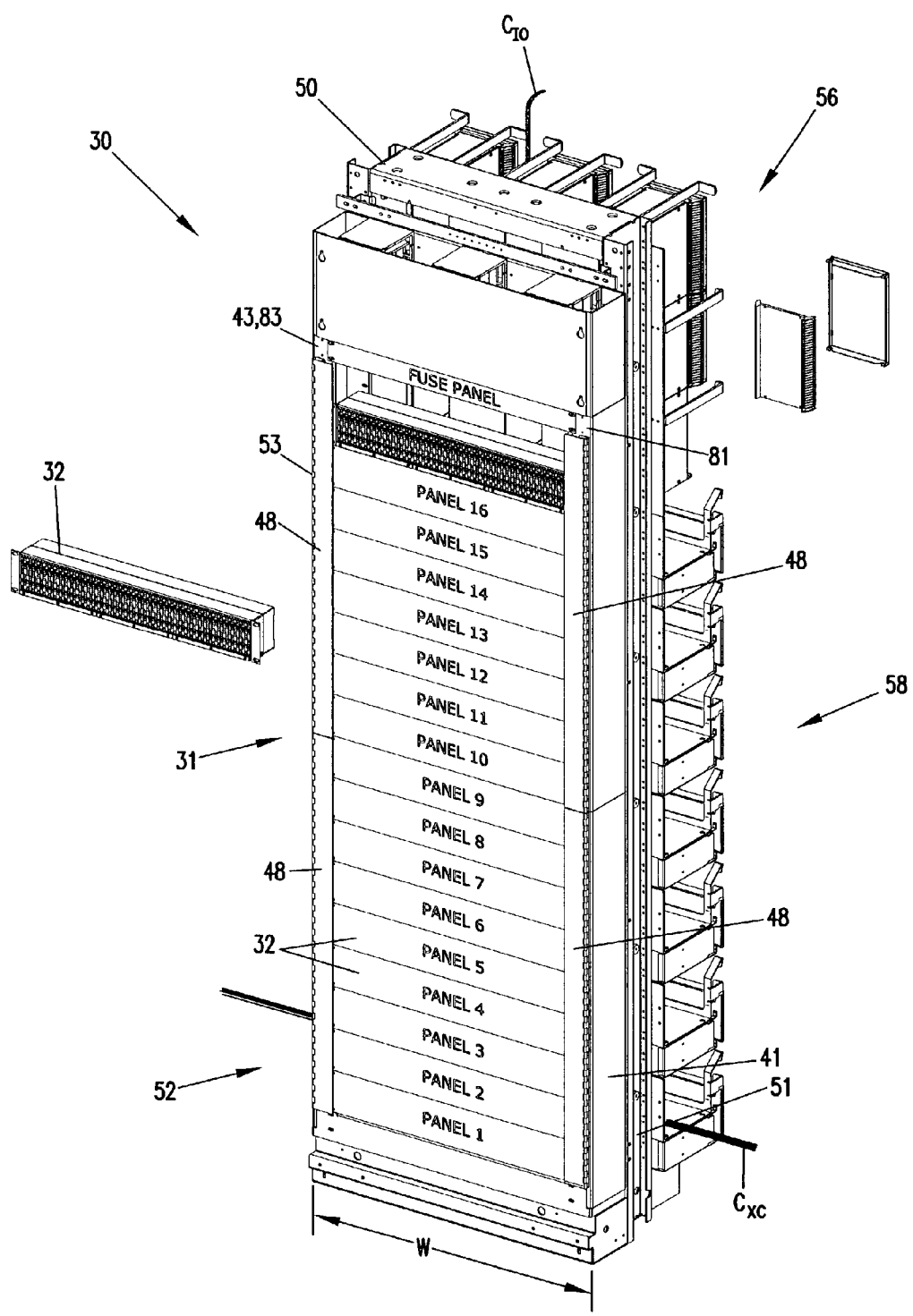
FIG. 3 is a front perspective view of the DSX system of FIG. 2.
Figure 4:
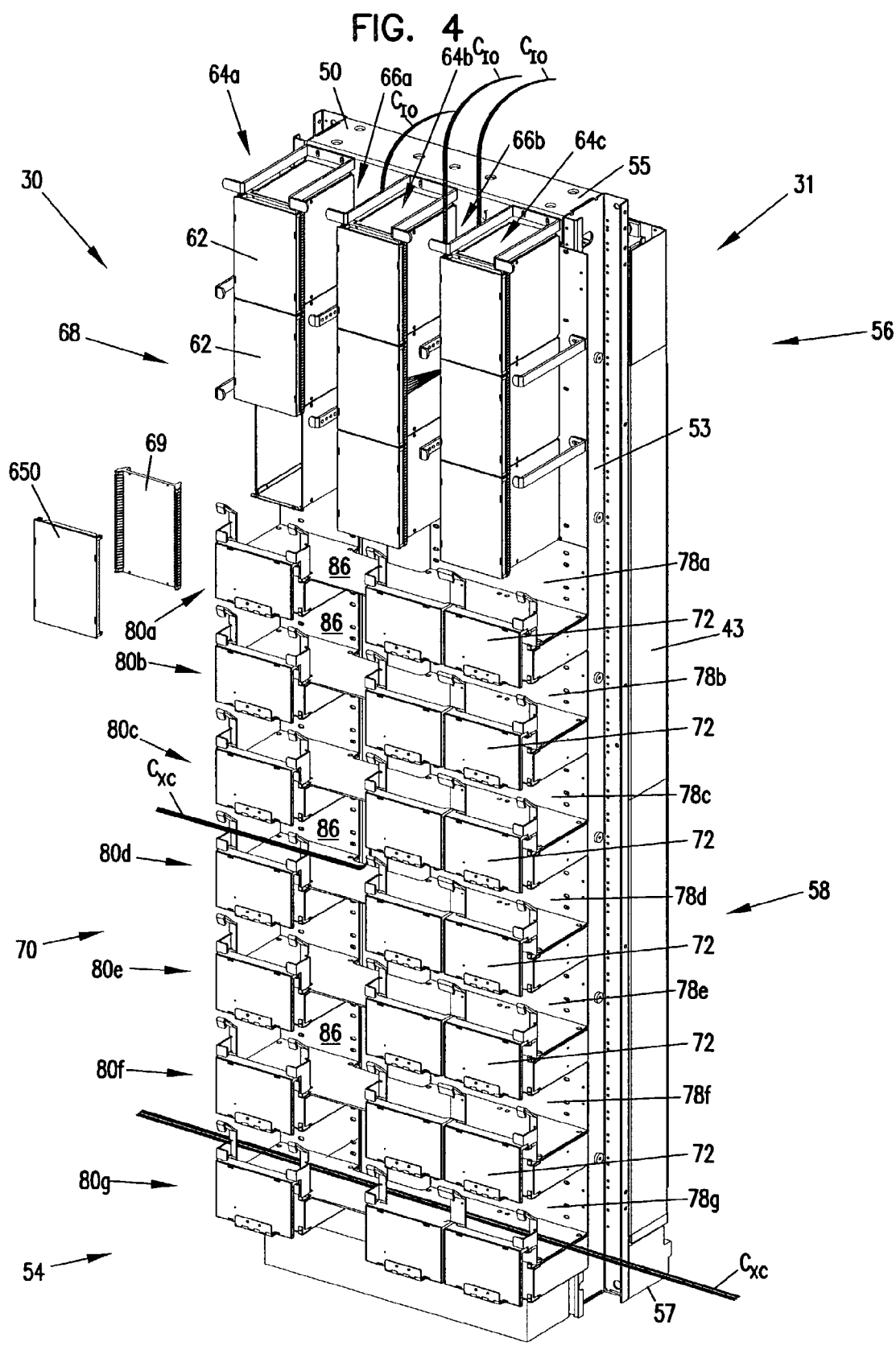
FIG. 4 is a rear perspective view of the DSX system of FIG. 2.
Figure 5:
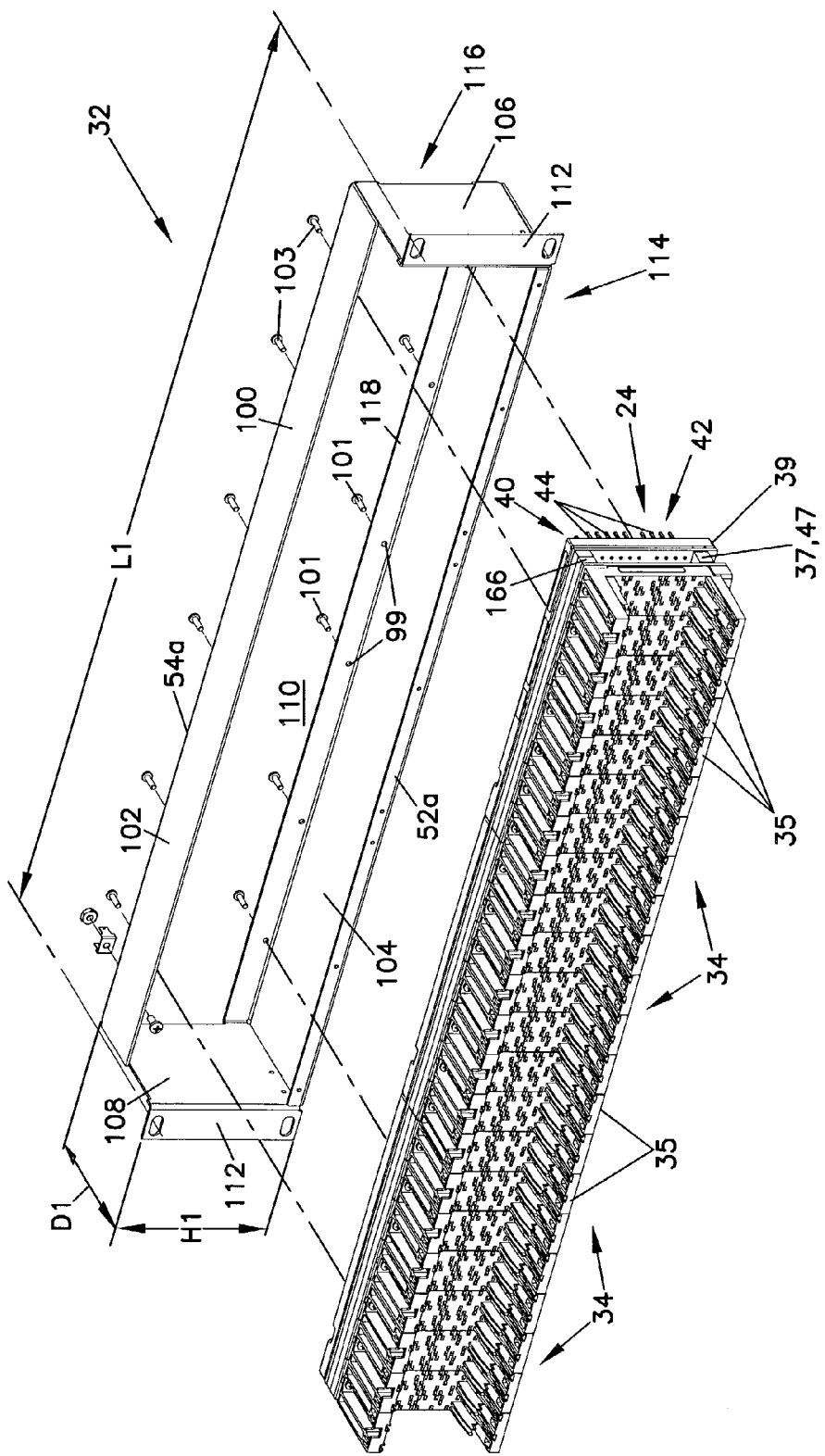
FIG. 5 is an exploded front perspective view of a chassis that is an embodiment in accord with the present disclosure.
Figure 6:
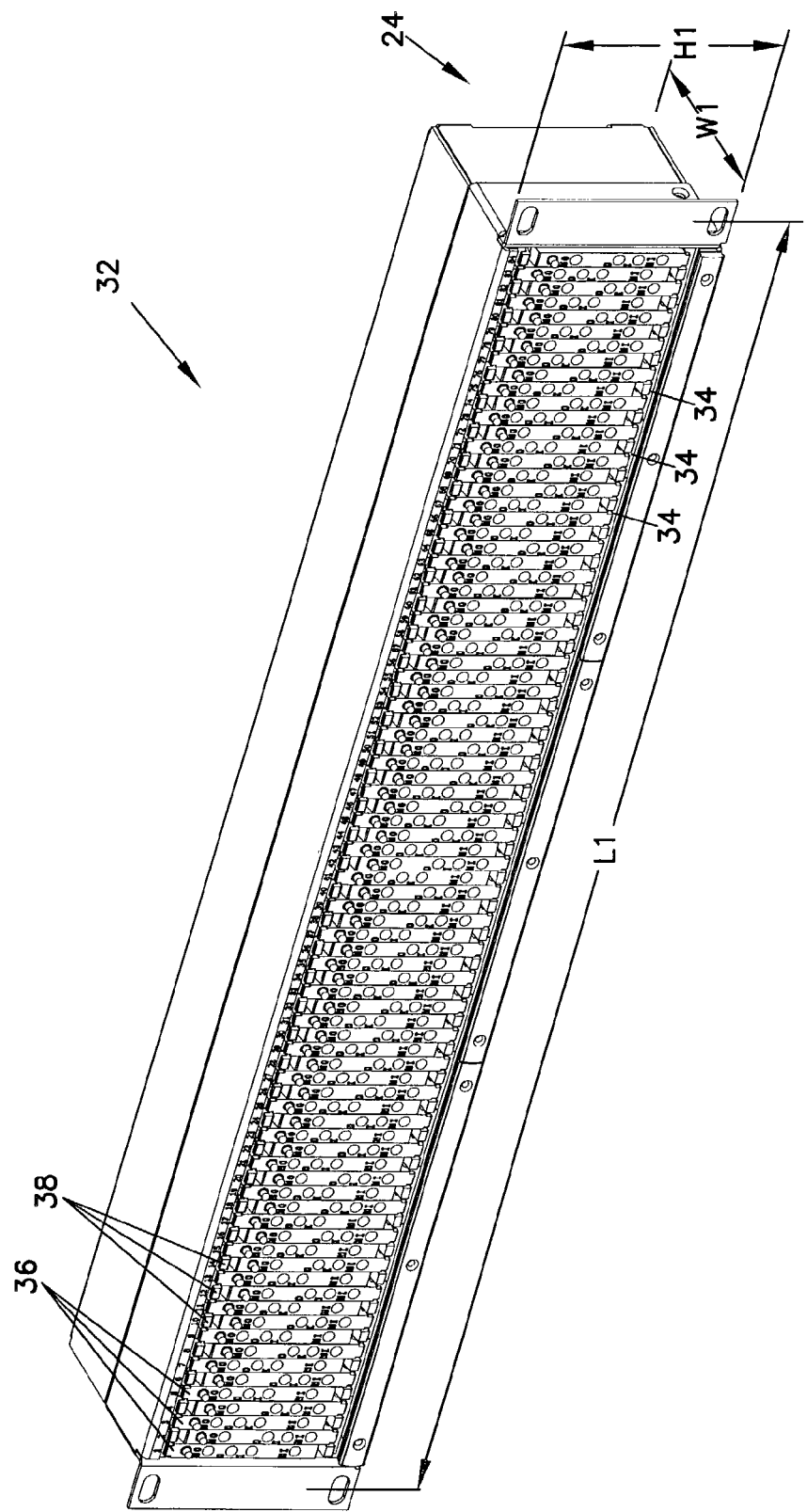
FIG. 6 is a front perspective view of the chassis of FIG. 5 shown with jack inserts.
Figure 7:
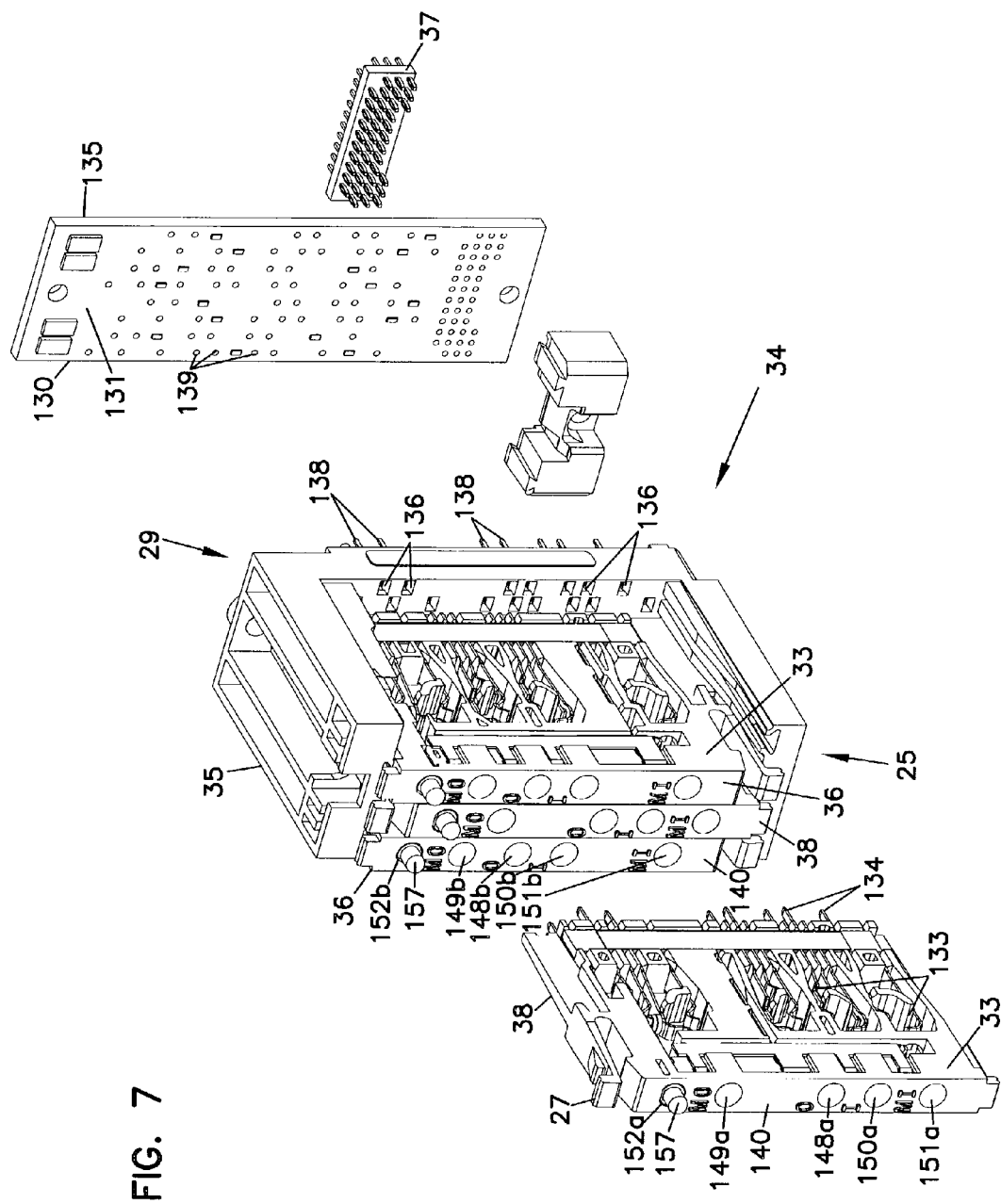
FIG. 7 is an exploded front perspective view of a jack module shown in FIGS. 5 and 6 that is an embodiment in accord with the present disclosure.
Figure 10:
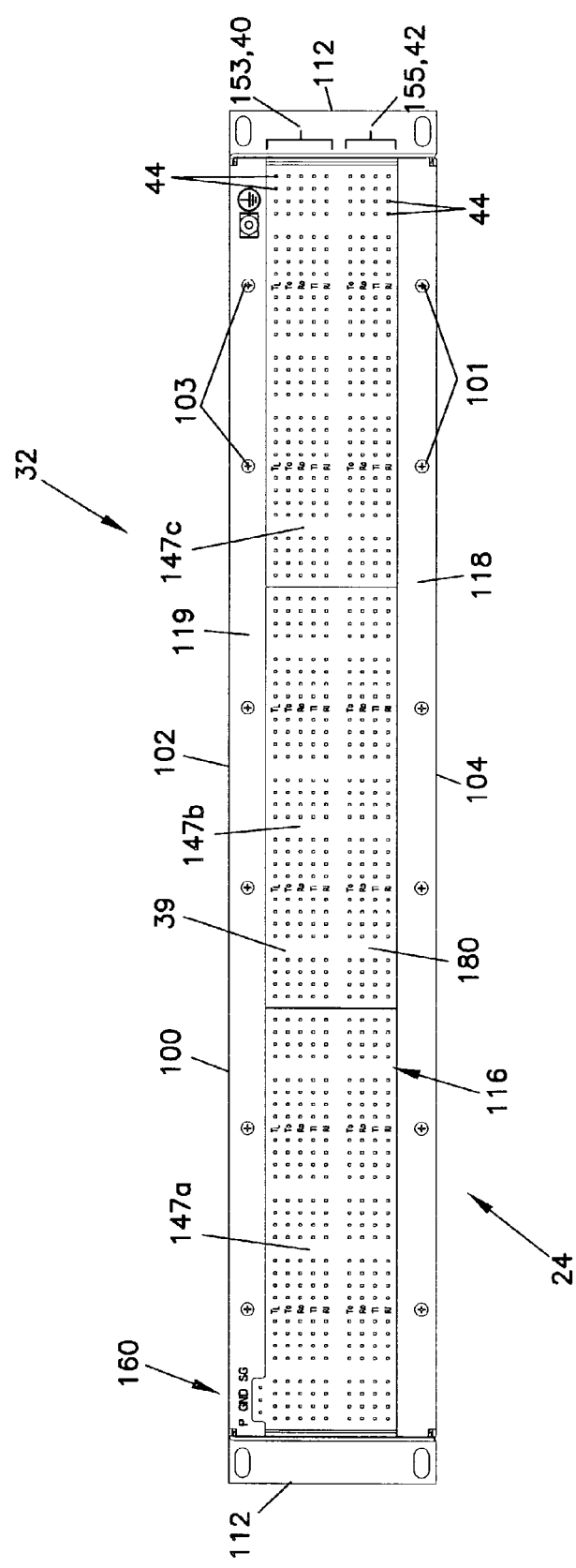
FIG. 10 is a rear elevational view of the chassis and back plane assembly shown in FIGS. 5 and 9.

FIGS. 2–4 illustrate a high density DSX system 30 that is one embodiment of the present disclosure. The DSX system 30 includes a bay 31 having a front side 52 (FIG. 3) and an opposite back side 54 (FIG. 4). The bay 31 is configured to hold a plurality (e.g., eighteen) of chassis 32. Each chassis 32 is sized to hold a plurality (e.g., twenty-one) of removable jack modules 34. Each of the jack modules 34 includes a jack mount 35 configured to hold a plurality (e.g., four) of jack inserts 36, 38 (FIGS. 5, 6 and 7). The jack modules 34 are electrically interconnected to a back plane 24 (FIGS. 5 and 6) that mounts at the rear of each chassis 32. The back plane 24 includes a rearwardly facing cross-connect field 40 and a rearwardly facing IN/OUT field 42 (FIG. 10). The fields 40, 42 may also be referred to as panels, arrays, or blocks. The fields 40, 42 include a plurality of termination structures that interconnect with a cross-connect region 70 and an IN/OUT region 68, respectively (shown schematically in FIG. 11B). The regions 68, 70 provide service provider interface locations at the back side 54 of the bay 31.

In general, the DSX system 30 defines normal-through circuits including normal through switches that provide electrical pathways between the IN/OUT field and the cross-connect field. Parts corresponding to the normal-through circuits provide means for breaking the normal-through connections between the IN/OUT and cross-connect fields to allow for signal patching and test operations. Monitor ports can also be provided.

II. Chassis

Referring now to FIG. 5, the chassis 32 of the DSX system 30 includes a chassis housing 100 having a front or front side 52a and a rear or back side 54a. A top wall 102 and a bottom wall 104 extend between the front side 52a and the back side 54a of the chassis housing 100. The top and bottom walls 102, 104 are interconnected by sidewalls 106, 108. In the illustrated embodiment, mounting flanges 112 extend from the sidewalls 106, 108 adjacent the front side 52a of the chassis housing 100. The mounting flanges 112 are used to mount the chassis 32 to the bay 31 (FIG. 3). Preferably, the chassis 32 is mounted to the bay 31 such that the front side 52a of the chassis corresponds to the front side 52 of the bay 31, and the back side 54a of the chassis faces the back side 54 of the bay 31.

The top and bottom walls 102, 104 and sidewalls 106, 108 cooperate to define an interior 110 for receiving the jack modules 34. The jack modules 34 mount side-by-side within the chassis 32. The interior 110 has a front opening 114 located adjacent the front side 52a of the housing 100 and a rear opening 116 located adjacent the back side 54a of the housing 100. Fasteners 101, 103 extend through upper and lower mounting strips (e.g. 119, 118 shown in FIG. 10) to securely fasten a back plane assembly 39 adjacent to the rear opening 116 of the chassis housing 100. In the preferred embodiment the rear opening 116 is configured to provide rear access to the cross-connect field 40 and the IN/OUT field 42 of the back plane 24.

In one embodiment, the chassis 32 is adapted for housing a plurality of jack inserts, preferably at least 56 jack inserts, or 14 jack modules each having 4 jack inserts. To conform to conventional international standards, the chassis 32 can have a length L1 of about 19 inches. An embodiment having a length L1 of about 19 inches can house, for example, 64 jack inserts, or 16 jack modules. This embodiment has a jack insert density of greater than 40 jack inserts per foot of chassis length. Alternatively, in accordance with standard United States specifications, the chassis 32 could be configured to have a length L1 of about 23 inches, as shown in FIG. 6. An embodiment having a length L1 of about 23 inches can house, for example, 84 jack inserts, or 21 jack modules. This alternative embodiment has a jack insert density of greater than 43 jack inserts per foot of chassis length.

The chassis of the present disclosure is also configured to provide greater bay circuit density. In particular, the chassis has a height H1 and a depth D1. The height H1 is preferably less than 4 inches, more preferably less than or equal to 3.5 inches. One aspect for reducing the height as compared to prior art chassis relates to the positioning of both the IN/OUT filed and the cross-connect field at the rear of the chassis directly behind the jack modules. The rear access arrangement of the present disclosure reduces the overall height of the chassis and increases the stacked chassis density within the bay 31. Correspondingly, the bay circuit density increases.

In the illustrated embodiment, the depth D1 of the chassis is between 4 inches and 6 inches. Preferably the chassis depth D1 is equal to or less than 5 inches. Of course, other sizes of chassis and other numbers of jack modules could also be used.

III. DSX Jack Module

Referring now to FIG. 7, the jack modules 34 of the DSX system 30 generally includes a jack mount 35 for holding a plurality of jack inserts 36, 38, and a first circuit board section or module circuit board 130 for providing electrical connections between the jack inserts 36, 38 and the cross-connect and IN/OUT fields 40, 42 of the back plane 24 (FIG. 5). The jack mount 35 has a front 25 and a rear 29. The jack inserts 36, 38 are inserted into the jack mount 35 from the front 25. The module circuit board 130 is positioned adjacent the rear 29 of the jack mount 35.

a. Jack Mount

The jack mount 35 of each jack module 34 is preferably configured to removably receive the jack inserts 36 and 38. For example, the jack inserts 36, 38 can be retained within the jack mount 35 by resilient latches 27 as described in U.S. Pat. No. 6,116,961, which is hereby incorporated by reference. By flexing the latches 27, the jack inserts 36, 38 can be manually inserted into or removed from the jack mount 35.

Still referring to FIG. 7, the jack mount 35 of each jack module 34 includes a plurality of sockets 136 and contact pins 138 (as described in U.S. Pat. No. 6,116,961) for providing electrical interfaces with the jack inserts 36, 38 when the jack inserts 36, 38 are mounted in the jack mount 35. When assembled, the contact pins 138 are electrically connected directly to the module circuit board 130. Correspondingly, the contact pins 138, or intermediate electrical conductors, interconnect the jack inserts 36, 38 to the module circuit board 130.

While the jack module 34 is shown as a "four-pack" (i.e., a module including four jack inserts), it will be appreciated that alternative modules can include jack mounts sized to receive more or fewer than four jack inserts. However, it is contemplated that in other embodiments the jack inserts can be mounted directly within a chassis without using separate jack mounts for holding the jack inserts. Further other embodiment may include different jack insert mounting configurations. For example, in one embodiment, jack inserts can be fastened within the chassis by fasteners (e.g. bolts or screws) as compared to resilient latches.

b. DSX Jack Inserts

In the preferred embodiment, the jack inserts include odd jack inserts 36 and even jack inserts 38. What is meant by "odd" and "even" is that the odd jack inserts 36 have access ports that are vertically offset from respective access ports of the even jack inserts 38. This configuration is designed such that when the odd and even jack inserts 36, 38 are mounted within the jack mount 35, plug bores defined by the odd and even jack inserts 36, 38 are vertically staggered relative to one another, as will be described in greater detail.

Still referring to FIG. 7, each of the jack inserts 36, 38 includes a jack body 33; preferably the jack body is made of a dielectric material, such as plastic. The jack body 33 includes a front face 140 defining a plurality of access ports, in particular, an out port 148, a monitor out port 149, an in port 150 and a monitor-in port 151. (The ports are referred to generally as 148–151. In the Figures, the subscript 'a' (e.g. 148a) refers to the port of the odd jack inserts 36 and the subscript 'b' refers to the ports of the even jack inserts 38.) The access ports 148–151 are sized to receive tip-and-ring plugs. It is to be understood that the term "port" and "bore" are interchangeable. The jack inserts 36, 38 also define a light emitting diode (LED) access port 152 for receiving a tracer lamp 157. The access ports 148–152 are accessible from the front 52a of the chassis 32 when operably positioned within the chassis (FIG. 6).

The jack inserts 36, 38 include electrical contacts 133 corresponding to each of the ports 148–151. The contacts 133 include tails 134 that project rearwardly from each of the jack inserts 36, 38. When the jack inserts 36, 38 are inserted within the jack mount 35, the tails 134 of the contacts 133 slide within the sockets 136 of the jack mount 34 to provide electrical connections between the module circuit board 130 and the jack inserts 36, 38. When the jack inserts 36, 38 are removed from the jack mount 35, the jack inserts 36, 38 are electrically disconnected from the module circuit board 130 of the jack module 34.

Figure 8:
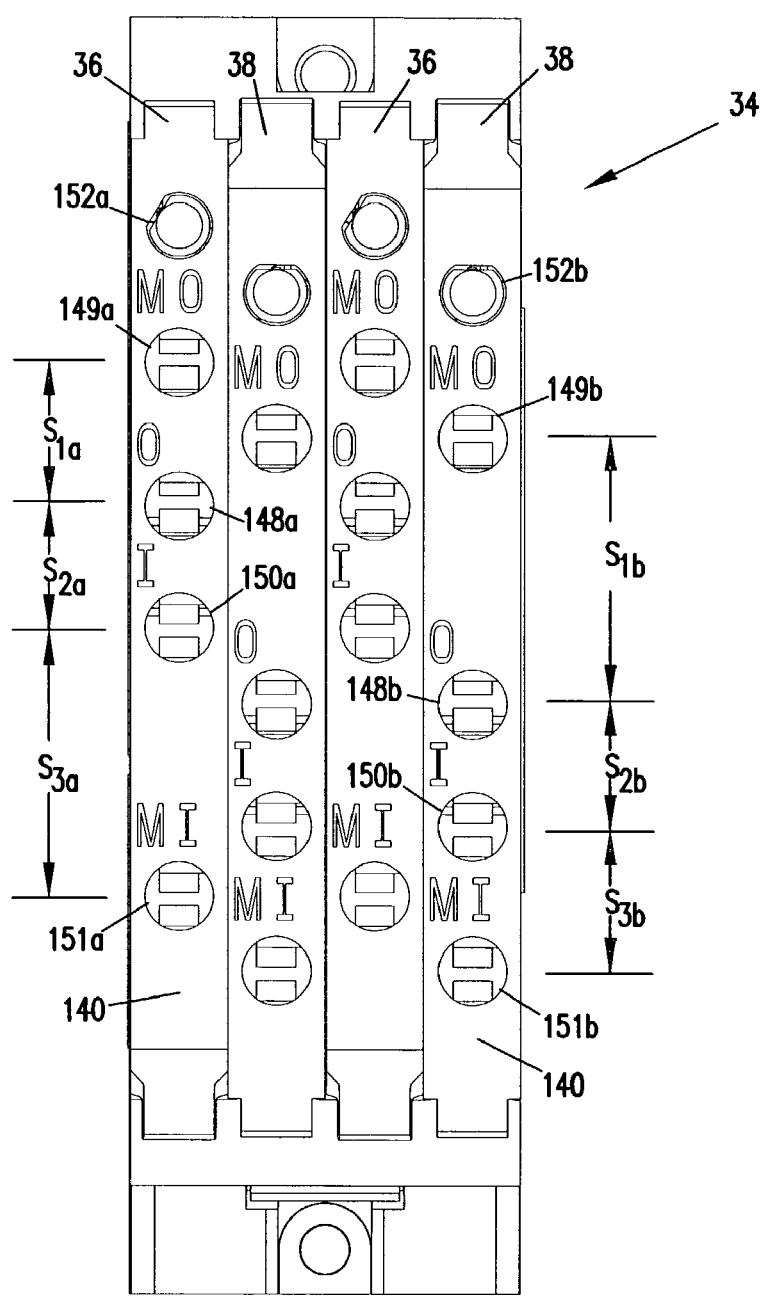
FIG. 8 is a front elevational view of the jack module of FIG. 7.

As best shown in FIG. 8, the front face 140 of the jack inserts 36, 38 is generally planar and defines, the out port 148, the monitor-out port 149, the in port 150, the monitor-in port 151, and the LED port 152. With reference to the odd jack inserts 36, the monitor-out port 149a is spaced a first spacing $S_{1a}$ from the out port 148a. The out port 148a is spaced a second spacing $S_{2a}$ from the in port 150a. The in port 150a is space a third spacing $S_{3a}$ from the monitor in port 151a. In the preferred embodiment, the third spacing $S_{3a}$ is greater than the first spacing $S_{1a}$; more preferably, the third spacing $S_{3a}$ is greater than both the first spacing $S_{1a}$ and the second spacing $S_{2a}$; most preferably, the third spacing $S_{3a}$ is greater than first spacing $S_{1a}$ and the first spacing $S_{1a}$ is greater than the second spacing $S_{2a}$.

With reference to the even jack inserts 38, it will be appreciated that the ports 148b–152b are arranged in a different pattern than the ports 148a–152a. For example, a larger spacing exists between the monitor-out port 149b and the out port 148b of even jack inserts 36 as compared to the monitor out port 149a and the out port 148a of the odd jack inserts 38. Additionally, a reduced spacing exists between the in port 150b and the monitor-in port 151b as compared to the in port 150a and the monitor in port 151a. More specifically, the monitor-out port 149b is spaced a first spacing $S_{1b}$ from the out port 148b. The out port 148b is spaced a second spacing $S_{2b}$ from the in port 150b. The in port 150b is spaced a third spacing $S_{3b}$ from the monitor-in port 151b. In the preferred embodiment, the first spacing $S_{1b}$ is greater than the third spacing $S_{3b}$; more preferably, the first spacing $S_{1b}$ is greater than both the third spacing $S_{3b}$ and the second spacing $S_{2b}$; most preferably, the first spacing $S_{1b}$ is greater than third spacing $S_{3b}$ and the third spacing $S_{3b}$ is greater than the second spacing $S_{2b}$.

As illustrated in FIG. 8, the out port 148a and the in port 150a of the odd jack inserts 36 are positioned or aligned with the first spacings $S_{1b}$ of the even jack inserts 38. Likewise, the out port 148b and the in port 150b of the even jack inserts 38 are positioned or aligned with the third spacings $S_{3a}$ of the odd jack inserts 36. This staggering configuration, in combination with the rear access, is one aspect of the disclosed system contributing to the high circuit density feature of the present invention.

c. Jack Module Circuit Board

Referring back to FIG. 7, the module circuit board 130 of the jack module 34 is positioned directly behind the jack mount 35 and jack inserts 36, 38. The module circuit board 130 includes a major first side 131, a major second side 135, and a plurality of plated through-holes 139. The major first side 131 faces the front opening 114 of the chassis 32 (FIG. 5) and the major second side 135 faces the rear opening 116 of the chassis.

The plurality of plated through-holes 139 receive the contact pins 138 of the sockets 136 to provide a direct electrical connection between the module circuit board 130 and the pins 138. When a jack insert 36, 38 is inserted within the jack mount 35, the contacts 133 of the jack inserts 36, 38 are in electrical contact with the sockets 136 and thereby also with the module circuit board 130.

Figure 9:
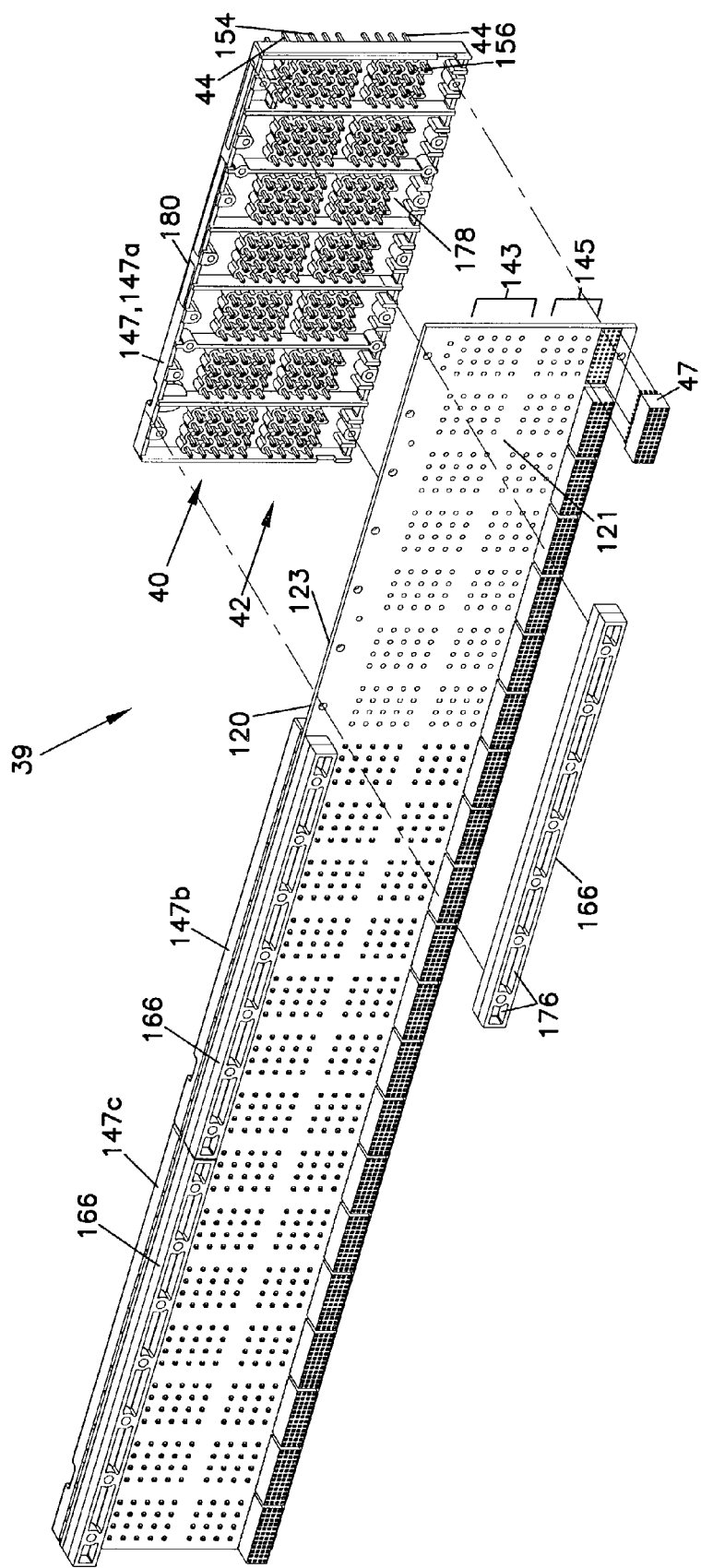
FIG. 9 is an exploded front perspective view of a back plane assembly that mounts at the rear of the chassis of FIG. 5.

A connector 37 is electrically interconnected with tracings of the module circuit board 130 to electrically connect to the contact pins 138, and ultimately the contacts 133 of the jack inserts 36, 38. The connector 37 operably (i.e. electrically and mechanically) corresponds to a mating connector 47 of the back plane assembly 39 (FIG. 9). The connectors 37 and 47 provide electrical communication between the jack module 34 and the cross-connect field 40 and the IN/OUT field 42 of the back plane assembly 39.

IV. Back Plane

Referring again to FIG. 5, the back plane 24 includes a back plane assembly 39 that mounts within the interior 110 of the chassis housing 100 adjacent to the rear opening 116. In general, the jack insert modules 34 are interconnected to the back plane assembly 39 by inserting the jack insert modules 34 through the front opening 114 of the chassis housing 100. When fully inserted within the chassis 32, the modules 34 and their corresponding jack inserts are electrically connected to corresponding termination structures 44 of the cross-connect field 40 and the IN/OUT field 42.

As best shown in FIG. 9, the back plane assembly 39 includes a second circuit board section or back plane circuit board 120 and a plurality of connectors 47. In the illustrated embodiment, the back plane circuit board 120 is a single circuit board and is co-extensive with the back plane 24 of the chassis 32. The back plane circuit board 120 includes a major first side 121 and a major second side 123. The major first side 121 faces the front opening 114 of the chassis 32 (FIG. 5) and the major second side 123 faces the rear opening 116 of the chassis. In the illustrated embodiment, the major sides 121, 123 of the back plane circuit board 120 are generally parallel to the major sides 131, 135 of the module circuit board 130 (FIG. 7). Further, the back plane circuit board 120 and the module circuit board 130 are generally parallel to the back plane 24 of the system 30 (FIG. 5).

The connectors 47 are located on the major first side 121 of the back plane circuit board 120 and electrically connect each individual jack module 34 to the back plane circuit board 120. The back plane circuit board 120 is in turn, electrically interconnected with the cross-connect field 40 and the IN/OUT field 42.

The back plane circuit board 120 shown in FIG. 9 includes a first array of through-holes or openings 143 and a second array of through-holes or openings 145. Preferably the openings 143 and 145 are plated openings configured for receipt of the termination structures 44 to provide a direct electrical connection between the back plane circuit board 120 and the structures 44. In other words, the termination structures 44 are directly connected to the back plane circuit board 120 through electrical connection with the openings 143 and 145.

In the illustrated embodiment, the termination structures include wire wrap pins/posts. The termination structures 44 may also include or other types of connectors/contacts for terminating a wire (e.g., insulation displacement connectors; multi-pin connectors; co-axial connectors such as BNC connectors, 1.6/5.6 connectors or SMB connectors; or RJ series connectors such as RJ45 connectors, RJ48 connectors or RJ21 connectors).

Referring now to FIG. 10, the back plane assembly 39 includes a power source 160 that provides power to the back plane circuit board 120 and thereby to each of the individual jack modules 34. The power source 160 includes a ground connection, a power connection, and a sleeve ground connection. In the illustrated embodiment of FIG. 9, the power source 160 is located above the cross-connection field 40.

In an alternative embodiment, the back plane assembly 39 may include a plurality of individually sized back plane circuit boards (not shown) that are configured and sized to correspond to a single jack module 34. In this alternative, each of the individual back plane circuit boards can be electrically interconnected to a power source by a daisy chain strip.

Referring back to FIG. 9, a spacer piece or standoff structure 166 is disposed between the back plane circuit board 120 and the module circuit boards 130 (shown in FIG. 5) to structurally support and properly align the jack modules 34. In the illustrated embodiment, the standoff structure 166 has recesses 176 and includes three sections of structure configured to properly position and orient a plurality of jack modules 34 (e.g. seven jack modules). It is contemplated the standoff structure may also include a structure sized to position and orient any other number of jack modules, including a continuous single structure sized to position and orient twenty-one jack modules.

The back plane assembly 39 also includes a termination member support structure 147 preferably made of a dielectric material such as plastic. The support structure 147 has a forward side 178 and a rearward side 180. In the embodiment shown, the support structure 147 is divided into three support structure sections 147a, 147b, and 147c. However, a single one-piece section could also be used.

As shown best in FIG. 10, the support structure 147 defines a first field or array of openings 153 for receiving the wire wrap pins 44 of the cross-connect field 40, and a second field or array of openings 155 for receiving the wire wrap pins 44 of the IN/OUT field 42. The wire wrap pins 44 are preferably press fit or staked through the openings 153, 155 and preferably have ends 154 (FIG. 9) that project rearwardly from a rearward side 180 of the support structure. Opposite ends 156 of the pins 42 preferably terminate at the openings 143, 145 of the back plane circuit board 120 to provide an electrical connection therewith.

V. Electrical Overview

Referring generally to FIG. 5, to mount a jack module 34 in electrical communication with the back plane 24 of the chassis 32, the jack module 34 is inserted through the front opening 114 of the chassis 32. The jack module 34 is inserted rearwardly into the interior 110 of the chassis 32 until the connector 37 of the jack module engages the corresponding connector 47 that projects forwardly from the back plane assembly 39 of the chassis 32. The jack mounts 34 are then secured to the chassis 32. In similar fashion, the jack modules can be removed from the chassis 32 by un-securing the jack mount 34 manually pulling the module 34 from the front opening 114 of the chassis 32.

Individual jack inserts 36, 38 can be removed from and inserted into the jack module 34 as necessary. It is to be understood that in accord with the principles disclosed, the system can be configured such that the jack inserts are inserted within the chassis directly to the back plane without the intermediate jack module 34 connection. For example, the chassis itself can include integral jack mounting structure (e.g. guide or tracks) for individually receiving the jack inserts.

Figure 11A:
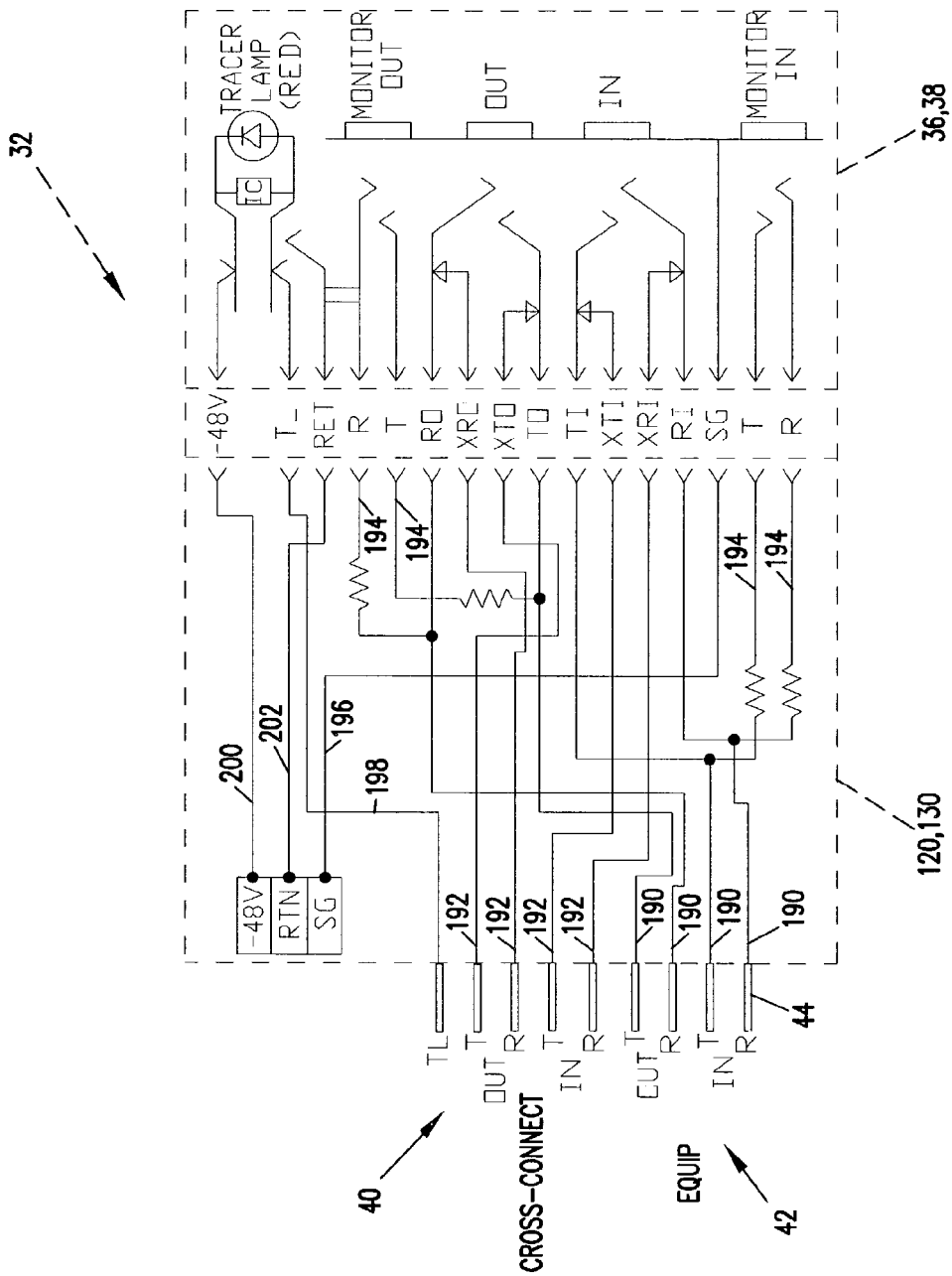
FIG. 11A is a schematic diagram of a DSX circuit provided by the jacks and back plane assembly of FIGS. 5 and 9.

Referring now to FIG. 11A, a circuit schematic of one of the jack inserts 36, 38 in relation to the rear access configuration of the chassis 32 is illustrated. As shown, the electrical contacts of the jack inserts 36, 38 include a voltage contact −48V, tracer lamp contact TL, and return contact RET corresponding to an LED circuit. The electrical contacts also include tip springs T and ring springs R corresponding to the monitor-in and monitor-out ports. The electrical contacts further include a tip-in contact TI, ring-in contact RI, cross-connect tip-in contact XTI, and cross-connect ring-in contact XRI corresponding to the in port. The electrical contacts further include a tip-out contact TO, ring-out contact RO, cross-connect tip-out contact XTO, and cross-connect ring-out contact XRO corresponding to the out port. The contacts operate in the same manner described in U.S. Pat. No. 6,116,961 that was previously incorporated by reference. The contacts TI, RI, XTI and XRI and the contacts TO, RO, XTO and XRO include springs that cooperate to define normally "through" or normally "closed" switches that provide electrical pathways between the cross-connect field 40 and the IN/OUT field 42 in the absence of a plug.

In particular, the first and second circuit board sections 130, 120 include tracings 190 that electrically connect the wire wrap pins 44 of the IN/OUT field 42 to the contacts TI, RI, TO and RO of the jack inserts 36, 38. The circuit board sections 130, 120 also include tracings 192 that provide electrical connections between the wire wrap pins 44 of the cross-connect field 40 and contacts XTI, RTI, XTO and XRO of the jack inserts 36, 38. Additionally, the circuit board sections 130, 120 include tracings 194 that electrically connect the tracings 190 to the MONITOR ports of the jack inserts 36, 38.

Further, as illustrated schematically, the circuit board sections 130, 120 include tracing 196 for connecting a sleeve ground pin (not shown) to the sleeve ground contact SG of the jack inserts 36, 38; tracing 198 for connecting a tracer lamp pin of the cross-connect field 40 to the tracer lamp contacts TL of the jack inserts 36, 38; tracing 200 for connecting a power pin (not shown) to the voltage contact −48V of the jack inserts 36, 38; and tracing 202 for connecting a power return pin (not shown) to the return contact RET of the jack inserts 36, 38.

Figure 11B:
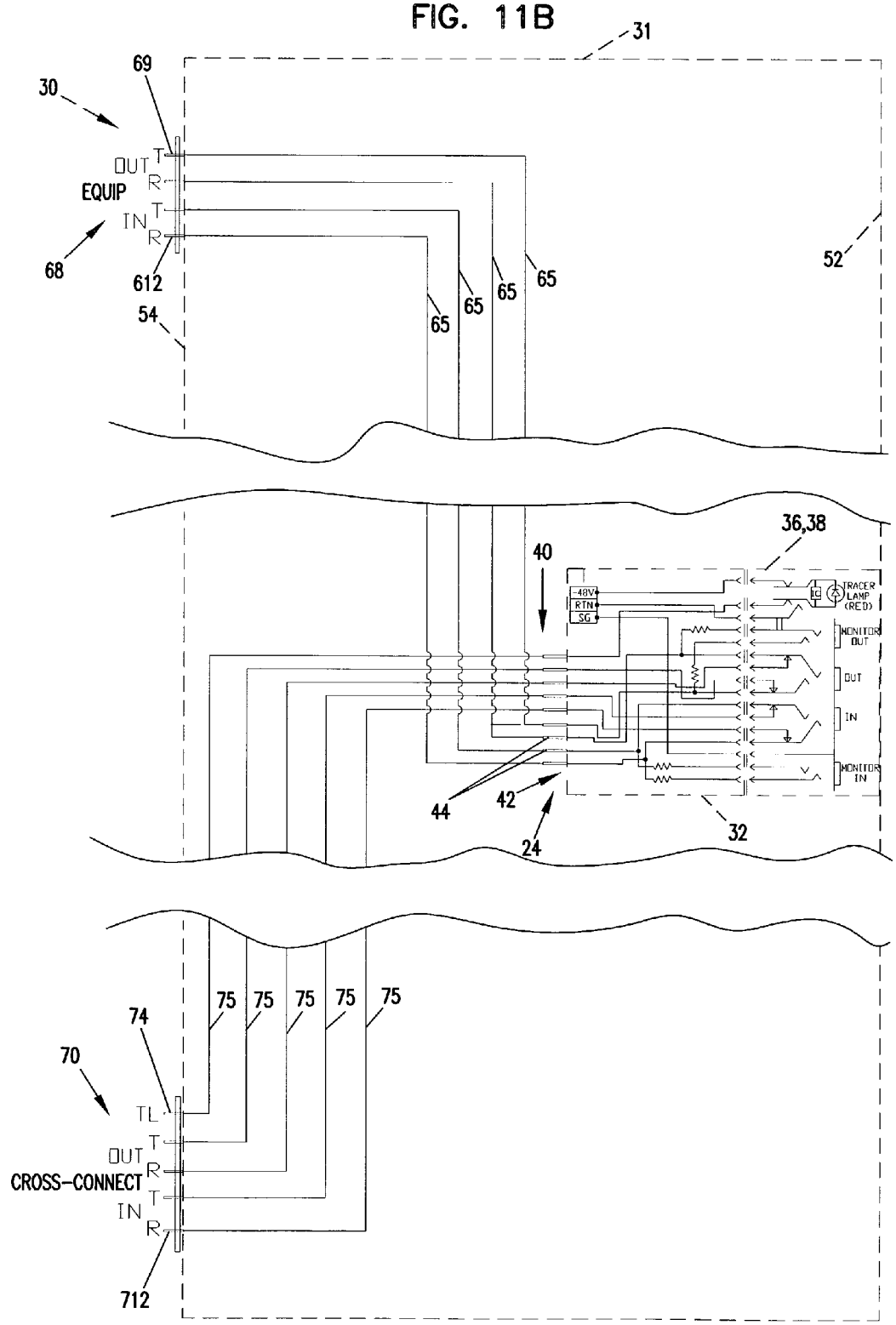
FIG. 11B is a schematic diagram of a DSX circuit for the DSX system of FIGS. 2–4.

FIG. 11B illustrates the one jack insert 36, 38 interconnected to the DSX system 30. The chassis 32 is arranged such that the back plane 24 faces the back side 54 of the bay 31. Thus, when the chassis 32 is mounted to the bay 31, intermediate electrical connection 65 and 75 can be routed from the back plane 24 of the chassis 32 to an IN/OUT region 68 and a cross-connect region 70 located on the back side 54 of the bay 31 (see also FIG. 2).

VI. High-Density DSX Bay

Referring back to FIG. 2, the bay 31 of the high density DSX system 30 includes a frame 50 (i.e. a rack) having a front 52, a rear 54, a top 55, and a bottom 57. The frame 50 has a height H measured from the bottom 57 to the top 55, a depth D measured from the front 52 to the rear 54, and a width W (FIG. 3) measured between side supports 51, 53 the frame 50. In the illustrated embodiment the height H of the frame is between 7 feet and 12 feet; the depth D is between 15 and 19 inches; and the width W is between 22 and 30 inches. For a conventional U.S. rack, the height H is often about 9 to 11 feet; the depth D is about 18.75 inches; and the width W is about 26 inches. For a conventional European rack, the height H is about 2.2 m; the depth D is about 746 mm; and the width W is about 600 mm.

As schematically illustrated in FIG. 11B, the system 30 is arranged such that the IN/OUT fields 42 are electrically connected to the IN/OUT region 68. As shown in FIGS. 2 and 4, the IN/OUT region 68 is positioned in an upper region 56 at the rear 54 of the bay 31. The cross-connect fields 42 are electrically connected to the cross-connect region 70. The cross-connect region 70 is located in a lower region 58 at the rear 54 of the bay 31.

Referring now to FIG. 3, the front 52 of the bay 31 is configured to receive the plurality of the chassis 32. Each chassis 32 is secured to the bay 31 at mounting structure 41, 43 located adjacent the side supports 51, 53 of frame 50. The chassis 32 can be mounted to the frame 50 of the bay 31 using conventional fasteners. In particular, the mounting flanges 112 (FIG. 5) of the chassis 32 mount to forward facing surfaces 81, 83 of the mounting structure 41, 43. The forward facing surfaces 81, 83 may also be used to attach or adhere labels that identify the individual chassis 32. In the illustrated embodiment, hinged panels or doors, 48 are located on the mounting structures 41, 43 to cover the forward facing surfaces 81, 83 and provide additional area upon which identification material can be located.

The plurality of chassis 32 of the present system 30 typically includes about 14–21 chassis, preferably 18 chassis. In the illustrated embodiment having 18 chassis, the system 30 is configured to accommodate 84 circuits (21 jack modules each having 4 jack inserts) at each chassis for a system total of 1512 circuits (18 chassis each having 84 cross connection circuits).

Other chassis sizes and bay sizes are contemplated. In accord with the principles disclosed, the chassis 32 and the bay 31 provide an increased circuit density not previously provided by conventional systems, to effectively and efficiently manage of a mass number of digital circuits.

a. IN/OUT region

Referring back to FIG. 4, the IN/OUT region 68 located in the upper region 56 of the bay 31 includes a plurality of IN/OUT wire termination blocks 62. Each IN/OUT termination block includes a termination panel 69.

Figure 12:
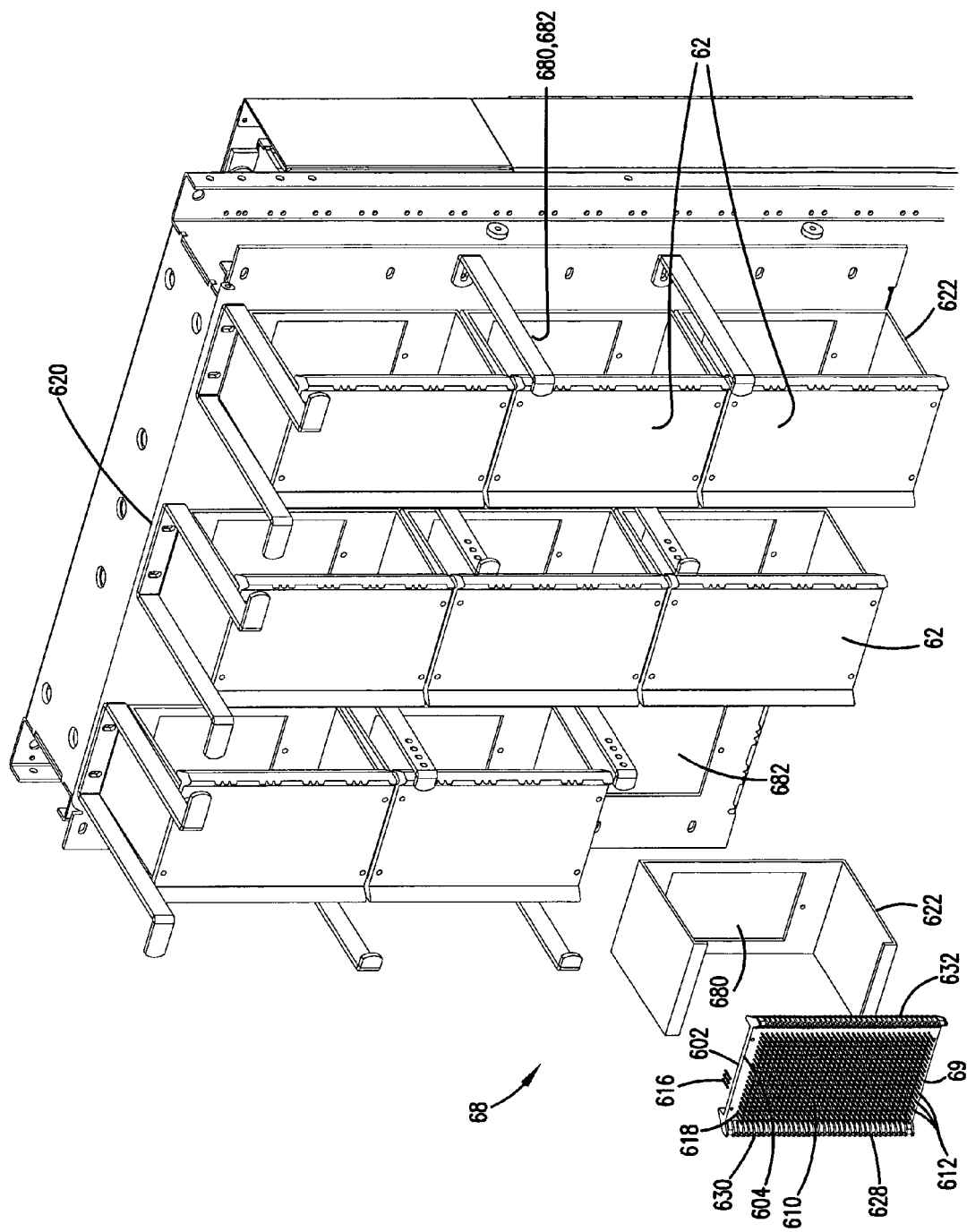
FIG. 12 is an exploded rear perspective view of an IN/OUT termination region shown in FIGS. 2 and 4.

As shown best in FIG. 12, the termination blocks 62 are mounted to a frame backing 620 by a bracket 622. The frame backing 620 is secured to the rear or back side 54 of the frame 50 (FIG. 4). In the illustrated embodiment of FIG. 4, the blocks 62 are arranged in a plurality of columns 64 (e.g. 3 vertical columns 64a–64c). Vertical IN/OUT cable management channels 66 (i.e. channels 66a and 66b) are defined between the columns 64 of termination blocks 62.

In the illustrated system 30, the cables $C_{10}$ are routed from the ceiling of the surrounding area. The cables $C_{10}$ enter the top 55 of the bay 31, are routed through the vertical IN/OUT cable management channels 66, and terminate at the termination panels 69 of the IN/OUT region 68. In particular, the cables $C_{10}$ are routed within the vertical IN/OUT cable management channels 66 and can be directed to either column of blocks 62 (i.e. 64a or 64b and 64b or 64c) defining the vertical channel 66. A block 62 located in the central vertical column 64b can thereby have a first terminating cable $C_{10}$ that is routed within a first vertical channel (e.g. 66a) and a second terminating cable $C_{10}$ that is routed within a second vertical channel (e.g. 66b).

It is contemplated that the cables $C_{10}$ can be routed from a raised floor and enter the bay 31 from the bottom 57. In a raised floor application the IN/OUT region 68 can be located in the lower region 58 of the bay 31 and the cross-connect region 70 can be located in the upper region 56.

The IN/OUT field 42 of each chassis 32 is electrically connected to a corresponding termination panel 69 of the IN/OUT region 68 by the interconnect or intermediate IN/OUT cable 65, shown schematically in FIG. 11B. In the illustrated embodiment, two chassis are connected to each of the termination blocks 62. The intermediate IN/OUT cables 65 are routed from the IN/OUT field 42 of the back plane 24 of the chassis 32 through cable passages 680 and 682 (FIG. 12) in the frame backing 620 and bracket 622.

Referring back to FIG. 12, each of the IN/OUT termination panels 69 includes a front side 602, a rear side 604, and a plurality of termination members 612. In the illustrated embodiment, the termination members 612 include wire wrap pins or posts that are mounted within an array of holes 610 extending through the panel 69. More specifically, the termination members 612 have a front end or portion 616 that extends from the front side 602 of the termination panel 69 and a rear end or portion 618 that extends from the rear side 604 of the panel 69. (For clarity, only a few termination members 612 are shown in FIG. 12 and the termination members are omitted from FIG. 4. It will be appreciated that in actual use, a termination member 612 will be staked through each of the holes 610 of the panel 69. The termination members 612 are shown schematically in FIG. 11A.)

Aside from including wire wrap pins/posts, the termination members 612 may also include or other types of connectors/contacts for terminating a wire (e.g., insulation displacement connectors; multi-pin connectors; co-axial connectors such as BNC connectors, 1.6/5.6 connectors or SMB connectors; or RJ series connectors such as RJ45 connectors, RJ48 connectors or RJ21 connectors).

Referring still to FIG. 12, the IN/OUT termination panels 62 preferably include at least one cable management device 628. The cable management device 628 can include, for example, tie down bars, rings, fingers, loops, brackets, or punch-out areas. In the illustrated embodiment the cable management device 628 includes a fanning strip 630, more preferably, a first fanning strip 630 and a second fanning strip 632 to separate and organize wires of the equipment cable $C_{10}$ that terminate on the termination panels 69.

The termination blocks 62 may include hinged covers 650 (FIG. 4) to cover and protect the termination members 612 extending from the rear side 604 of the panels 69. Preferably the cover 650 is arranged to pivot about hinges at either the first or second fanning strips 630, 632 (FIG. 12) to provide access to cables positioned in either of the fanning strips 630, 632. Preferably, the covers are removable from the IN/OUT termination panels 62 and include snap-fit hinges for ease of assembly and access to the covered termination members 612.

b. Cross-connect region

Referring back to FIG. 4, the cross-connect region 70 located in the lower region 58 of the bay 31 includes a plurality of cross-connect wire termination blocks 72. Each cross-connect termination block 72 includes a cross-connect termination panel 74 (see FIG. 13). The plurality of cross-connect termination blocks 72 are arranged in rows 80 (e.g. 6 horizontal rows 80a–80g). Horizontal cross-connect cable management channels 78 (i.e. horizontal channels 78a–78g) are defined between the rows 80 of the cross-connect blocks 72. As will be described in greater detail, the horizontal cross-connect channels 78 receive cables $C_{xc}$ from other bays that terminate at cross-connect blocks 72 of the cross-connect region 70.

Figure 13:
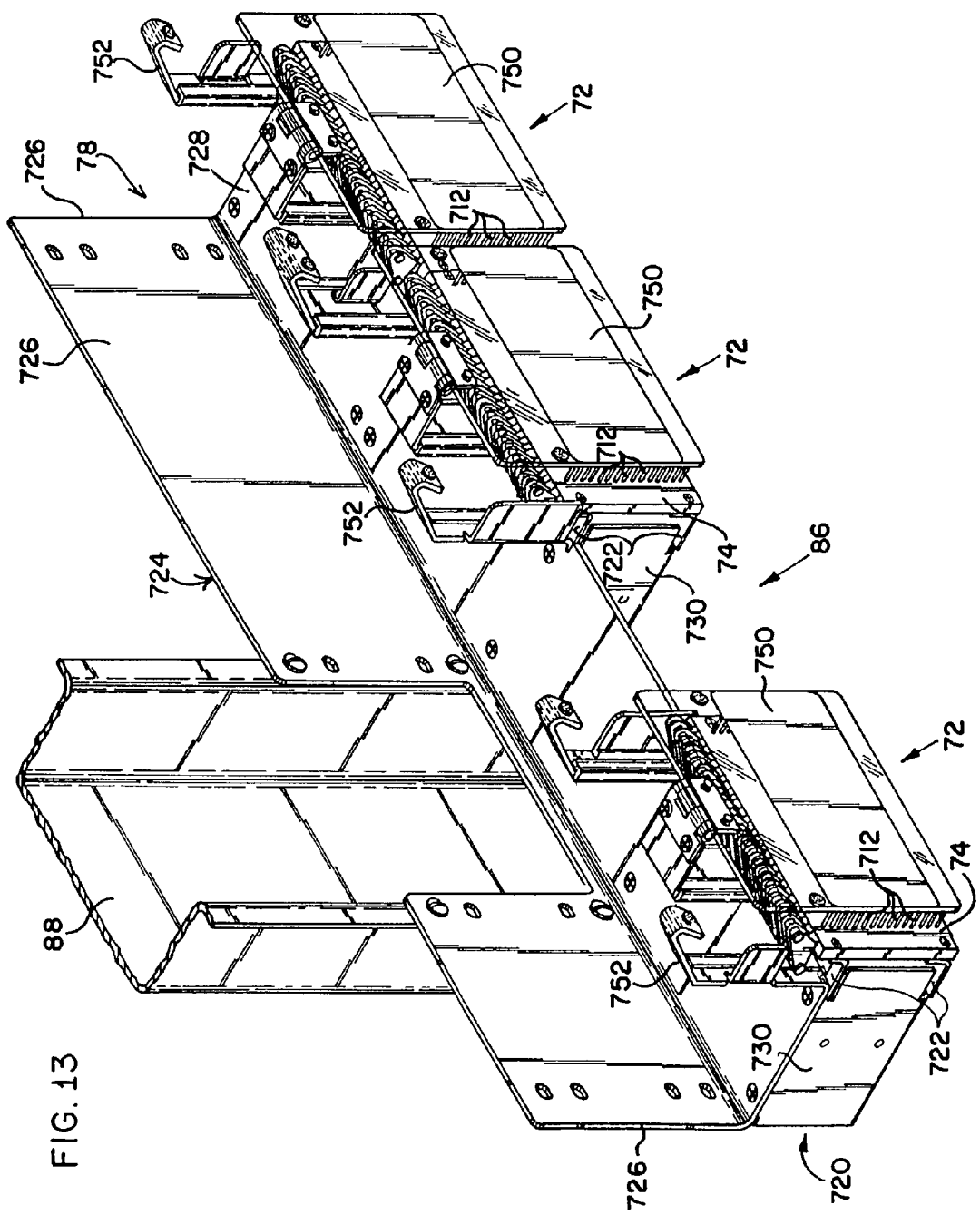
FIG. 13 is a rear perspective view of a portion of a cross-connect region shown in FIGS. 2 and 4.

One embodiment of a cross-connect termination region 70 is described in U.S. Pat. No. 5,220,600 (shown partially in FIG. 13 of the present disclosure) and herein incorporated by reference in its entirety. As shown in FIG. 13, a vertical cross-connect cable management channel 88 is forwardly offset from the horizontal cross-connect cable management channels 78(a–g). The vertical cross-connect cable management channel 88 allows cables to be routed from one horizontal cross-connect channel, e.g. 78a, to another horizontal cross-connect channel, e.g. 78d. Thereby the cables within the cross-connect termination region 70 are contained within the frame 50 and do not have to be routed along an exterior side of the frame. Access gaps or openings 86 (FIGS. 4 and 13) are provided in the horizontal rows 80 between the connector blocks 72. The access openings 86 assist a user in routing cables from the vertical cross-connect cable management channel 88 to one of the horizontal cross-connect channel 78a–78g, and vise versa.

The cross-connect field 40 of each chassis 32 is electrically connected to a corresponding cross-connect termination panel 74 of the cross-connect region 70 by the interconnect or intermediate cross-connect cable 75, shown schematically in FIG. 11B. In the illustrated embodiment, each chassis 32 is connected to a single corresponding connector block 72. The intermediate cross-connect cable 75 is routed from the cross-connect field 40 of the back plane 24 of the chassis 32 through openings 720 (FIG. 13). The openings 720 are essentially the open regions of the frame 50 where no horizontal channel 78 structures extend. Thus the intermediate cross-connect cables 75 are routed directly through the frame to a horizontal cross-connect cable management channel 78 located approximately adjacent to the chassis 32. From there, the intermediate cross-connect cable 75 can be routed to a cross-connect termination block 70 associated with the particular horizontal channel, or routed to the vertical cross-connect channel 88 to another horizontal cross-connect cable management channel 78.

Figure 14:
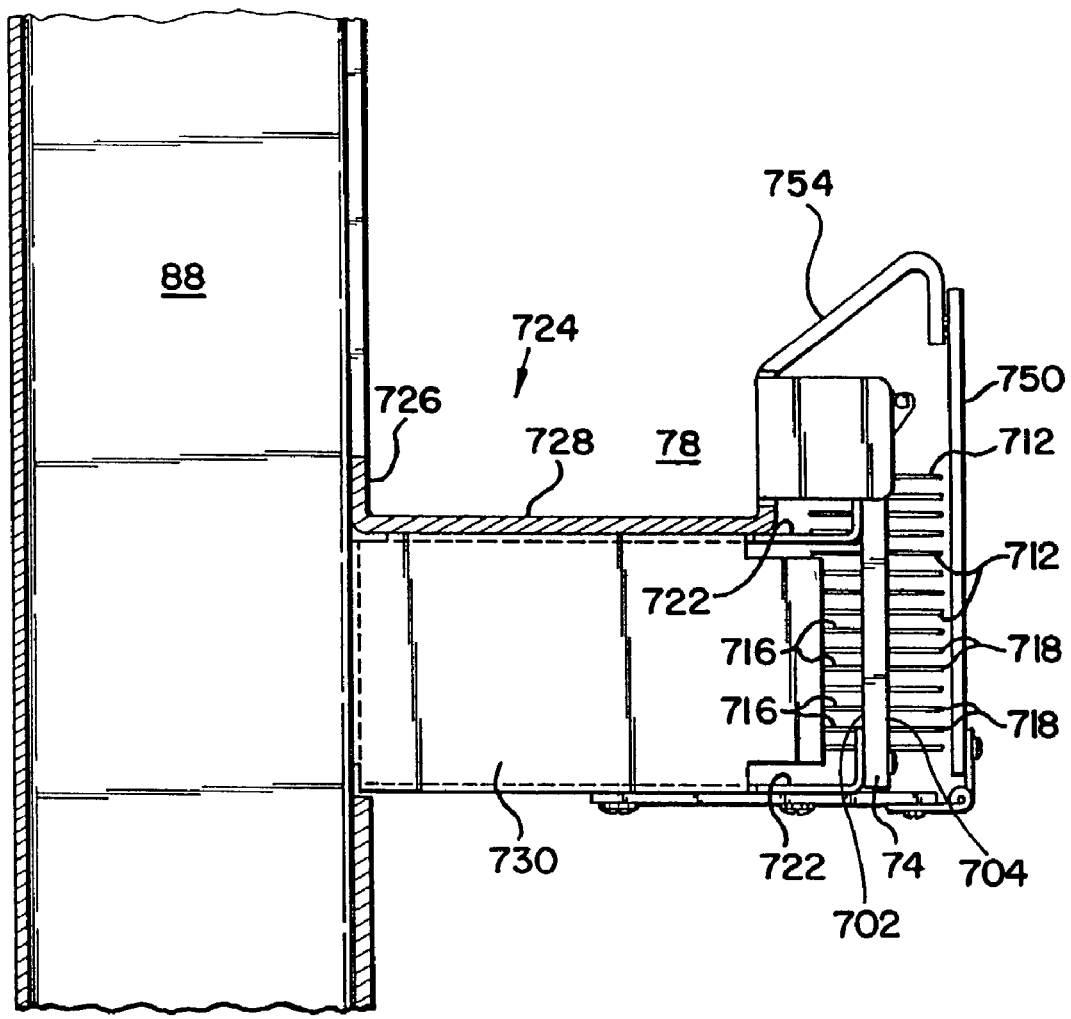
FIG. 14 is a side elevational view of the portion of the cross-connect region of FIG. 13.

As shown best in FIG. 14, each of the cross-connect termination panels 74 includes a front side 702, a rear side 704 and termination members 712. In the illustrated embodiment, the termination members 712 include wire wrap pins or posts that are mounted within an array of holes (not shown) extending through the panel 74. More specifically, the termination members 712 have a front end or portion 716 that extends from the front side 702 of the termination panel 74 and a rear end or portion 718 that extends from the rear side 704 of the panel 74. The intermediate cables 75 interconnect the front portions 716 of the termination members 712 of the cross-connect block 72 and the rear portion 154 of wire wrap pins 44 of the back plane 24 (i.e. of the cross-connect field 40).

Aside from including wire wrap pins/posts, the termination members 712 may also include or other types of connectors/contacts for terminating a wire (e.g., insulation displacement connectors; multi-pin connectors; co-axial connectors such as BNC connectors, 1.6/5.6 connectors or SMB connectors; or RJ series connectors such as RJ45 connectors, RJ48 connectors or RJ21 connectors).

Each cross-connect termination panel 74 is mounted to the lower region 58 of the frame 50 by a mounting bracket 722. The mounting bracket 722 is mounted to a generally L-shaped bracket 724 having a vertical plate 726 and a horizontal plate 728. The vertical plate 726 and the horizontal plate 728 generally define the horizontal cross-connect cable management channel 78. Side plates 730 (FIG. 13) can be positioned adjacent each particular termination blocks 72 that have exposed sides to protect the electrical wire connections extending from the front sides 702 of the panels 74.

In the illustrated embodiments of FIGS. 13 and 14, a cover 750 is provided to protect the rear portions 718 of the termination members 712. The cover 750 is pivotally attached to the mounting bracket 722. The cover 750 can be configured to pivot upward to access the termination members 712, as shown in FIG. 13; or configured to pivot downward to access the termination member 712, as shown in FIG. 14. In the embodiment of FIG. 13, a retaining structure 752 selectively retains the cover 750 is an open position. In the embodiment of FIG. 14, another retaining structure 754 selectively retains the cover 750 in a closed position.

c. Overall Cable Management

With the arrangement thus described, a large number of digital cross connection circuits can be effectively managed and organized. In particular, for example, cables $C_{10}$ (FIG. 4) from separate pieces of equipment enter at the top 55 of the frame 50 and run within the vertical IN/OUT cable management channels 66 of the IN/OUT region 68. The equipment cables $C_{10}$ are positioned within the fanning strips 630, 632 (FIG. 12) and terminated at the rear side 604 of a particular termination panel 69. Each of the termination blocks 62 is connected to the back plane 24 of up to two corresponding chassis 32 by the intermediate IN/OUT cables 65. The intermediate IN/OUT cables 65 extends from the front side 602 of the termination panel 69 to the corresponding IN/OUT field 42 of the corresponding chassis 32. As described previously, the IN/OUT field 42 is in electrical communication with the cross-connect field 40 (e.g. by DSX switching circuitry). The cross-connect field 40 of the chassis 32 is interconnected to a corresponding connector block 72 by an intermediate cross-connect cable 75. The intermediate cross-connect cable 75 extends from the cross-connect field 42 of the chassis 32 to the front side 702 of the corresponding cross-connect panel 74 (FIG. 14). Cables $C_{xc}$ (FIG. 4) from other bays, routed within the horizontal cross-connect channels 78 (and vertical cross-connect channel 88) terminate at the rear side 704 of the termination panel 74 (i.e. terminate at the rear portion 718 of the termination members 712).

The cable management arrangement of the bay 31 is such that the IN/OUT cables $C_{10}$ enter at the top of the frame to eliminate side entrances so that additional bays can be positioned in a close side-by-side arrangement. The cables $C_{10}$ run along the vertical IN/OUT channels 66 to termination at an IN/OUT termination block 62. The intermediate IN/OUT cables 65 are contained solely within the frame 50. The intermediate cross-connect cables 75 are also contained solely within the frame 50. The cable management arrangement of the bay 31 is further configured such that horizontal channels 78a–78g are in horizontal alignment with other bays positioned in close side-by-side relation. When bays 31 are placed in a close side-by-side arrangement, the cross-connect cables $C_{xc}$ can be routed freely in a horizontal manner from one bay to another. With the vertical cross-connect channel 88 offset from the horizontal cross-connect channels 78, the cables $C_{xc}$ are not obstructed and can be diverted or routed to the vertical channel 88 or a cross-connect termination panel 71 in an organized manner.

It will be appreciated that the DSX system 30 is utilized in the same manner as a conventional DSX system. The IN/OUT blocks 42 allow the jacks 36, 38 to be connected to pieces of digital equipment. The cross-connect blocks 40 allow the jacks 36, 38 to be cross-connected by semi-permanent jumpers. The jacks 36, 38 provide normally-through circuits between the digital equipment connected to the IN/OUT blocks 42 and the cross-connect blocks 40. By inserting patch plugs in the MONITOR ports of the jacks 36, 38, signals passing through the jacks 36, 38 can be monitored without interrupting the signals. The tracer lamp circuits allow the cross-connected jacks being monitored to be traced as is described in U.S. Pat. No. 6,116,961. Plugs can be inserted in the IN or OUT ports of the jacks 36, 38 for testing or diagnostic purposes, or for re-routing signals to different pieces of digital equipment.

DSX systems and chassis are also disclosed in U.S. application Ser. No. not yet assigned, entitled REAR ACCESS DSX SYSTEM, and U.S. application Ser. No. not yet assigned, entitled TERMINATION PANEL WITH FANNING STRIPS, both applications being filed concurrently herewith and both incorporated herein by reference. Since many embodiments of the invention can be made without departing from the spirit and scope of the invention, the invention resides in the claims hereinafter appended.

We claim:

1. A telecommunications device comprising:
a rack having a front and a rear;
a plurality of chassis mounted at the front of the rack, the chassis each having a front and a rear, and the chassis each having a height less than 4 inches;
a plurality of jacks mounted in the chassis, the jacks including access ports adapted for receiving plugs, the jacks including normal-through switches having tip and ring springs for contacting the plugs when the plugs are inserted within the access ports, the normal through switches also including normal springs that engage the tip and ring springs when the plugs are not inserted in the access ports, the access ports being accessible from the front of the chassis, the jacks being arranged at a density of at least 40 jacks per foot of chassis width;
cross-connect termination structures positioned at the rear of the chassis;
IN/OUT termination structures positioned at the rear of the chassis;
normal-through circuits that electrically connect the IN/OUT termination structures of each chassis to the corresponding cross-connect termination structures of each chassis, the normal-through circuits including the normal-through switches;
IN/OUT termination panels mounted at the rear of the rack, the IN/OUT termination panels including front and rear sides, the IN/OUT termination panels being arranged in a plurality of vertical columns, the IN/OUT termination panels being electrically connected to the IN/OUT termination structures of the chassis by first interconnect cables that extend through the rack from the IN/OUT termination structures to the front sides of the IN/OUT termination panels;
cross-connect termination panels mounted at the rear of the rack, the cross-connect termination panels including front and rear sides, the cross-connect termination panels being arranged in a plurality of horizontal rows, the cross-connect termination panels being electrically connected to the cross-connect termination structures of the chassis by second interconnect cables that extend through the rack from the cross-connect termination structures to the front sides of the cross-connect termination panels;
the rack including vertical IN/OUT cable management channels positioned between the vertical rows of IN/OUT termination panels for managing IN/OUT cables coupled to the rear sides of the IN/OUT termination panels;
the rack including horizontal cross-connect cable management channels corresponding to at least some of the horizontal rows of cross-connect termination panels for managing cross-connect cables coupled to the rear sides of the cross-connect termination panels; and
the rack including at least one vertical cross-connect cable management channel that is forwardly offset from the horizontal cross-connect cable management channels, the rack also including cable access openings for allowing cross-connect cables to be routed from the vertical cross-connect cable management channel to the horizontal cross-connect cable management channels.

2. The telecommunications device of claim 1, wherein the normal-through circuits include electrical pathways provided by first and second circuit board sections that are electrically connected together, the first circuit board section being located behind the jacks and in front of the second circuit board section, the second circuit board section being located in front of the cross-connect termination structures and the IN/OUT termination structures, the first and second circuit board sections each including a major first side and a major second side, the major first sides facing in a forward direction and the major second sides facing in a rearward direction.

3. The telecommunications device of claim 2, wherein the IN/OUT termination structures and the cross-connect termination structures are mechanically and electrically connected directly to the second circuit board section.

4. The telecommunications device of claim 3, wherein the IN/OUT termination structures and the cross-connect termination structures comprise wire wrap members.

5. The telecommunications device of claim 1, wherein the normal-through circuits include electrical pathways provided by at least one circuit board for each chassis, the circuit boards being positioned adjacent backplanes of the chassis.

6. The telecommunications device of claim 5, wherein the IN/OUT termination structures and the cross-connect termination structures comprise wire wrap members connected directly to the circuit boards.

7. The telecommunications device of claim 1, further comprising at least one circuit board corresponding to each of the chassis, the circuit boards each having a first major side facing in a forward direction and a second major side facing in a rearward direction, wherein the IN/OUT termination structures and the cross-connect termination structures comprise wire wrap members that project rearwardly from the second major sides of the circuit boards.

8. The telecommunications device of claim 1, wherein the height of each chassis is less than or equal to 3.5 inches.

9. The telecommunications device of claim 8, wherein each jack includes two monitor ports.

10. The telecommunications device of claim 9, wherein each chassis holds at least 84 of the jacks.

11. The telecommunications device of claim 10, wherein the rack holds at least 18 of the chassis.

12. The telecommunications device of claim 1, wherein each jack includes two monitor ports.

13. The telecommunications device of claim 12, wherein each chassis holds at least 84 of the jacks.

14. The telecommunications device of claim 13, wherein the rack holds at least 18 of the chassis.

15. The telecommunications device of claim 1, wherein at least some jacks are arranged at a density of at least 43 jacks per foot of chassis width.

16. The telecommunications device of claim 1, wherein the jacks are arranged at a density of at least 43 jacks per foot of chassis width.

17. A telecommunications device comprising:
a rack having a front and a rear;
a plurality of chassis mounted at the front of the rack, the chassis each having a front and a rear;
a plurality of jacks mounted in the chassis, the jacks including access ports adapted for receiving plugs, the jacks including normal-through switches having tip and ring springs for contacting the plugs when the plugs are inserted within the access ports, the normal through switches also including normal springs that engage the tip and ring springs when the plugs are not inserted in the access ports, the access ports being accessible from the front of the chassis;
the jacks each including a dielectric body in which the tip springs, the ring springs and the normal springs are mounted, the dielectric body including front and rear ends, the front end defining the access ports, and the springs including tails that project rearwardly from the rear end of the dielectric body;
cross-connect termination structures positioned at the rear of the chassis;
IN/OUT termination structures positioned at the rear of the chassis;
normal-through circuits that electrically connect the IN/OUT termination structures of each chassis to the corresponding cross-connect termination structures of each chassis, the normal-through circuits including the normal-through switches;
IN/OUT termination panels mounted at the rear of the rack, the IN/OUT termination panels including front and rear sides, the IN/OUT termination panels being arranged in a plurality of vertical columns, the IN/OUT termination panels being electrically connected to the IN/OUT termination structures of the chassis by first interconnect cables that extend through the rack from the IN/OUT termination structures to the front sides of the IN/OUT termination panels;
cross-connect termination panels mounted at the rear of the rack, the cross-connect termination panels including front and rear sides, the cross-connect termination panels being arranged in a plurality of horizontal rows, the cross-connect termination panels being electrically connected to the cross-connect termination structures of the chassis by second interconnect cables that extend through the rack from the cross-connect termination structures to the front sides of the cross-connect termination panels;
the rack including vertical IN/OUT cable management channels positioned between the vertical rows of IN/OUT termination panels for managing IN/OUT cables coupled to the rear sides of the IN/OUT termination panels;
the rack including horizontal cross-connect cable management channels corresponding to at least some of the horizontal rows of cross-connect termination panels for managing cross-connect cables coupled to the rear sides of the cross-connect termination panels; and
the rack including at least one vertical cross-connect cable management channel that is forwardly offset from the horizontal cross-connect cable management channels, the rack also including cable access openings for allowing cross-connect cables to be routed from the vertical cross-connect cable management channel to the horizontal cross-connect cable management channels.

18. The telecommunications device of claim 17, wherein the normal-through circuits include electrical pathways provided by first and second circuit board sections that are electrically connected together, the first circuit board section being located behind the jacks and in front of the second circuit board section, the second circuit board section being located in front of the cross-connect termination structures and the IN/OUT termination structures, the first and second circuit board sections each including a major first side and a major second side, the major first sides facing in a forward direction and the major second sides facing in a rearward direction.

19. The telecommunications device of claim 18, wherein the IN/OUT termination structures and the cross-connect termination structures are mechanically and electrically connected directly to the second circuit board section.

20. The telecommunications device of claim 19, wherein the IN/OUT termination structures and the cross-connect termination structures comprise wire wrap members.

21. The telecommunications device of claim 17, wherein the normal-through circuits include electrical pathways provided by at least one circuit board for each chassis, the circuit boards being positioned adjacent backplanes of the chassis.

22. The telecommunications device of claim 21, wherein the IN/OUT termination structures and the cross-connect termination structures comprise wire wrap members connected directly to the circuit boards.

23. The telecommunications device of claim 17, further comprising at least one circuit board corresponding to each of the chassis, the circuit boards each having a first major side facing in a forward direction and a second major side facing in a rearward direction, wherein the IN/OUT termination structures and the cross-connect termination structures comprise wire wrap members that project rearwardly from the second major sides of the circuit boards.

24. A telecommunications device comprising:
a rack having a front and a rear;

a plurality of chassis mounted at the front of the rack, the chassis each having a front and a rear;

a plurality of jacks mounted in the chassis, the jacks including access ports adapted for receiving plugs, the jacks including normal-through switches having tip and ring springs for contacting the plugs when the plugs are inserted within the access ports, the normal through switches also including normal springs that engage the tip and ring springs when the plugs are not inserted in the access ports, the access ports being accessible from the front of the chassis;

at least one circuit board corresponding to each of the chassis, the circuit boards each having a first major side facing in a forward direction and a second major side facing in a rearward direction;

cross-connect termination structures positioned at the rear of the chassis, the cross-connect termination structures including wire wrap members that project rearwardly from the circuit boards;

IN/OUT termination structures positioned at the rear of the chassis, the IN/OUT termination structures including wire wrap members that project rearwardly from the circuit boards;

normal-through circuits that electrically connect the IN/OUT termination structures of each chassis to the corresponding cross-connect termination structures of each chassis, the normal-through circuits including the normal-through switches;

IN/OUT termination panels mounted at the rear of the rack, the IN/OUT termination panels being electrically connected to the IN/OUT termination structures of the chassis by first interconnect cables that extend through the rack from the IN/OUT termination structures to the IN/OUT termination panels; and cross-connect termination panels mounted at the rear of the rack, the cross-connect termination panels being electrically connected to the cross-connect termination structures of the chassis by second interconnect cables that extend through the rack from the cross-connect termination structures to the cross-connect termination panels.

25. The telecommunications device of claim 24, wherein the IN/OUT termination structures and the cross-connect termination structures are terminated directly to the circuit boards.

26. A telecommunications device comprising:

a rack having a front and a rear;

a plurality of chassis mounted at the front of the rack, the chassis each having a front and a rear;

a plurality of jacks mounted in the chassis, the jacks including access ports adapted for receiving plugs, the jacks including normal-through switches having tip and ring springs for contacting the plugs when the plugs are inserted within the access ports, the normal through switches also including normal springs that engage the tip and ring springs when the plugs are not inserted in the access ports, the access ports being accessible from the front of the chassis;

cross-connect termination structures positioned at the rear of the chassis;

IN/OUT termination structures positioned at the rear of the chassis;

normal-through circuits that electrically connect the IN/OUT termination structures of each chassis to the corresponding cross-connect termination structures of each chassis, the normal-through circuits including the normal-through switches;

IN/OUT termination panels mounted at the rear of the rack, the IN/OUT termination panels including front and rear sides, the IN/OUT termination panels being arranged in a plurality of vertical columns, the IN/OUT termination panels being electrically connected to the IN/OUT termination structures of the chassis by first interconnect cables that extend through the rack from the IN/OUT termination structures to the front sides of the IN/OUT termination panels;

cross-connect termination panels mounted at the rear of the rack, the cross-connect termination panels including front and rear sides, the cross-connect termination panels being arranged in a plurality of horizontal rows, the cross-connect termination panels being electrically connected to the cross-connect termination structures of the chassis by second interconnect cables that extend through the rack from the cross-connect termination structures to the front sides of the cross-connect termination panels;

the rack including vertical IN/OUT cable management channels positioned between the vertical rows of IN/OUT termination panels for managing IN/OUT cables coupled to the rear sides of the IN/OUT termination panels, at least one of the vertical IN/OUT cable management channels providing access to more than one vertical column of IN/OUT termination panels;

the rack including horizontal cross-connect cable management channels corresponding to at least some of the horizontal rows of cross-connect termination panels for managing cross-connect cables coupled to the rear sides of the cross-connect termination panels; and the rack including at least one vertical cross-connect cable management channel that is forwardly offset from the horizontal cross-connect cable management channels, the rack also including cable access openings for allowing cross-connect cables to be routed from the vertical cross-connect cable management channel to the horizontal cross-connect cable management channels.

27. The telecommunications device of claim 26, wherein at least one of the IN/OUT terminations panels having IN/OUT cables coupled to the rear side has a first IN/OUT cable positioned within a first vertical IN/OUT cable management channel and terminating at the rear side of the panel, and a second IN/OUT cable positioned within a second vertical IN/OUT cable management channel and terminating at the rear side of the panel.

* * * * *

UNITED STATES PATENT AND TRADEMARK OFFICE
CERTIFICATE OF CORRECTION

PATENT NO. : 7,095,844 B2
APPLICATION NO. : 10/277174
DATED : August 22, 2006
INVENTOR(S) : Baker et al.

It is certified that error appears in the above-identified patent and that said Letters Patent is hereby corrected as shown below:

Col. 10, line 11: "the cables $C_{10}$ are routed" should read --the cables $C_{IO}$ are routed--

Col. 10, line 12: "The cables $C_{10}$ enter the" should read --The cables $C_{IO}$ enter the--

Col. 10, line 16: "cables $C_{10}$ are routed" should read --cables $C_{IO}$ are routed--

Col. 10, line 21: "cable $C_{10}$ that is" should read --cable $C_{IO}$ that is--

Col. 10, line 22: "cable $C_{10}$ that is" should read --cable $C_{IO}$ that is--

Col. 10, line 24: "cables $C_{10}$ can be" should read --cables $C_{IO}$ can be--

Col. 11, line 2: "cable $C_{10}$ that terminate" should read --cable $C_{IO}$ that terminate--

Col. 12, line 45: "cables $C_{10}$ (FIG." should read --cables $C_{IO}$ (FIG.--

Col. 12, line 49: "cables $C_{10}$ are positioned" should read --cables $C_{IO}$ are positioned--

Col. 13, line 4: "cables $C_{10}$ enter at" should read --cables $C_{IO}$ enter at--

Col. 13, line 7: "$C_{10}$ run along" should read --$C_{IO}$ run along--

Signed and Sealed this

Twentieth Day of January, 2009

JON W. DUDAS
*Director of the United States Patent and Trademark Office*